United States Patent
Tsutsumi et al.

[11] Patent Number: 5,142,477
[45] Date of Patent: Aug. 25, 1992

[54] SUSPENSION CONTROL SYSTEM

[75] Inventors: Yasuhiro Tsutsumi, Susono; Yuji Yokoya, Toyota; Yoshimichi Hara, Kuwana; Eiju Matsunaga, Anjou; Hiroyuki Kawata, Chiryu; Akira Fukami, Okazaki; Yutaka Suzuki, Nishio, all of Japan

[73] Assignees: Toyota Jidosha Kabushiki Kaisha, Toyota; Nippondenso Co., Ltd., Kariya, both of Japan

[21] Appl. No.: 602,696

[22] Filed: Oct. 24, 1990

[30] Foreign Application Priority Data

Oct. 25, 1989 [JP] Japan .................. 1-277575
Nov. 28, 1989 [JP] Japan .................. 1-308305

[51] Int. Cl.⁵ .......................................... B60G 17/00
[52] U.S. Cl. ................... 364/424.05; 280/707
[58] Field of Search .................. 364/424.01, 424.05; 280/707, 734, 735

[56] References Cited

U.S. PATENT DOCUMENTS

| | | | |
|---|---|---|---|
| 4,671,533 | 6/1987 | Asami et al. | 280/707 |
| 4,741,554 | 5/1988 | Okamoto | 280/703 |
| 4,907,154 | 3/1990 | Yasuda et al. | 364/424.05 |
| 4,954,957 | 9/1990 | Kawagoe et al. | 364/424.05 |
| 5,060,157 | 10/1991 | Tado et al. | 364/424.05 |
| 5,072,392 | 10/1991 | Taniguchi | 364/424.05 |
| 5,072,965 | 12/1991 | Wada et al. | 280/707 |

FOREIGN PATENT DOCUMENTS 61-287808 12/1986 Japan.
64-67407 3/1989 Japan.

Primary Examiner—Thomas G. Black
Attorney, Agent, or Firm—Cushman, Darby & Cushman

[57] ABSTRACT

A suspension control system for controlling a suspension having a shock absorber provided for a wheel of a vehicle includes a damping force change rate detector which detects a damping force change rate indicating a rate of change of a damping force of the shock absorber, and a damping force controller which alters the setting of the damping force on the basis of the relationship between the damping force change rate and an adjustment reference value. The system also includes a road surface condition detector which detects, for every first period, the condition of a road surface on which the vehicle is running on the basis of a change of the damping force of the shock absorber, and a damping force adjustment correcting unit which corrects the adjustment reference value by learning, for every second period, the adjustment reference value on the basis of a parameter related to the damping force of the shock absorber which reflects the condition of the road surface. Further, the system includes a period adjustment unit which adjusts the first period on the basis of a vehicle speed.

32 Claims, 20 Drawing Sheets

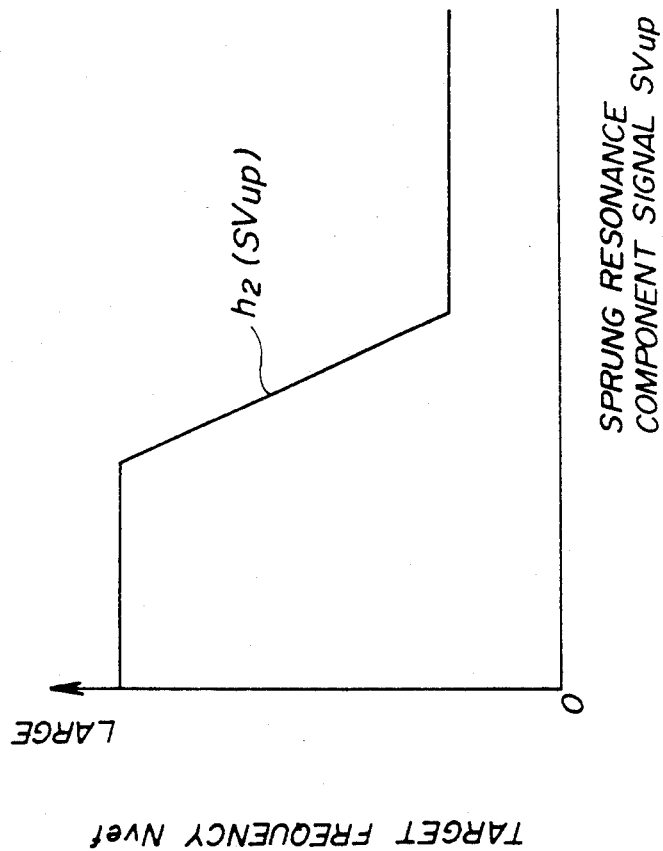

SUSPENSION CONTROL SYSTEM

BACKGROUND OF THE INVENTION

This application is generally related to a number of other applications which each define suspension control systems. Each of these related applications has been given an application number as listed below:

| NAME | APPLN. # | FILING DATE | ATTN-DOCKET # |
|---|---|---|---|
| Tsutsumi | 07/520,185 | May 8, 1990 | 78879CDCTY00 |
| Hara | 07/535,194 | June 7, 1990 | 76044/U3-900 |
| Tsutsumi | 07/580,387 | Sept 11, 1990 | 81282/CDC/TY |

(1) Field of the Invention

The present invention generally relates to a suspension control system, and more particularly to a suspension control system for controlling a damping force of a variable damping force type shock absorber on the basis of a running condition of a vehicle.

(2) Description of the Related Art

There is previously known a suspension control system in which the damping force of a shock absorber is controlled on the basis of the rate of change of the damping force. When the change rate of the damping force exceeds a predetermined value, that is, when the change rate changes abruptly due to a rough road surface or braking, the damping force with respect to a movement of the shock absorber is rapidly changed to a small level, so that the control response characteristics of the shock absorber are improved.

There is also known a suspension control system in which an adjustment reference value provided for obtaining the damping force change rate used for changing the setting of the damping force is altered on the basis of a driving condition, such as a vehicle speed, so that riding comfort is improved (see Japanese Laid-Open Patent Application No. 64-67407).

The conventional suspension control system proposed in the above-mentioned Japanese Application has an advantage in that the damping force is rapidly changed in accordance with the road surface condition so that good riding comfort is obtained. However, there is room for improvement in riding comfort in a case where the vehicle is continuously running on a flat road surface or a rough road surface for a predetermined time or longer. When the vehicle is continuously running on a flat road surface, the shock absorber is controlled so that the damping force thereof is maintained at a large level and thus the suspension is maintained in a hard state. In this state, the driver or passenger will feel the existence of a small roughness in the road surface. On the other hand, if the vehicle is continuously running on a rough road surface, the shock absorber is controlled so that the damping force thereof is continuously maintained at a small level and thus the suspension is continuously maintained in a soft state. This state deteriorates the road holding ability of the vehicle and causes the driver to feel uneasy. Improvements in riding comfort, driving controllability and stability are required particularly when the vehicle is traveling at high speeds.

SUMMARY OF THE INVENTION

It is a general object of the present invention to provide an improved suspension control system in which the above-mentioned disadvantages are eliminated.

A more specific object of the present invention is to provide a suspension control system in which riding comfort as well as driving stability and controllability obtained when the vehicle is traveling on a continuous flat or rough road surface, particularly at high speeds, are improved, so that the shock absorbers are rapidly controlled in response to the road surface condition.

The above-mentioned objects of the present invention are achieved by a suspension control system for controlling a suspension having a shock absorber provided for each wheel of a vehicle, the suspension control system comprising damping force change rate detecting means, for detecting a damping force change rate indicating a rate of change of a damping force of the shock absorber, damping force controlling means, coupled to the shock absorber and the damping force change rate detecting means, for altering the setting of the damping force on the basis of a relationship between the damping force change rate and an adjustment reference value, and road surface condition detecting means for detecting, for every first period, a condition of a road surface on which the vehicle is running on the basis of a change of the damping force of the shock absorber. The suspension control system also comprises damping force adjustment correcting means, coupled to the damping force controlling means and the road surface condition detecting means, for correcting the adjustment reference value by learning, for every second period, the adjustment reference value on the basis of a parameter related to the damping force of the shock absorber which reflects the condition of the road surface, and period adjusting means, coupled to the road surface condition, for adjusting the first period on the basis of a vehicle speed.

The aforementioned objects of the present invention are also achieved by a suspension control system for controlling a suspension having a shock absorber provided for a wheel of a vehicle, the suspension control system comprising damping force change rate detecting means, for detecting a damping force change rate indicating a rate of change of a damping force of the shock absorber, damping force controlling means, coupled to the shock absorber and the damping force change rate detecting means, for altering the setting of the damping force on the basis of a relationship between the damping force change rate and an adjustment reference value, and damping force adjustment correcting means, coupled to the damping force controlling means, for correcting the adjustment reference value by learning, for every predetermined period, the adjustment reference value on the basis of a parameter related to a change of the damping force of the shock absorber, sprung resonance component extracting means, coupled to the damping force detecting means, for extracting a sprung resonance component signal from the damping force change rate, the sprung resonance component signal including components having frequencies around a sprung resonance frequency of the shock absorber, and period adjusting means, coupled to the damping force adjustment correcting means and the sprung resonance component extracting means, for adjusting the predetermined period on the basis of the sprung resonance component signal.

BRIEF DESCRIPTION OF THE DRAWINGS

Other objects, features and advantages of the present invention will become more apparent from the following detailed description when read in conjunction with the accompanying drawings, in which:

FIG. 17D is a graph illustrating the relationship between the target frequency and the sprung resonance component signal;

DESCRIPTION OF THE PREFERRED EMBODIMENTS

Figure 1:
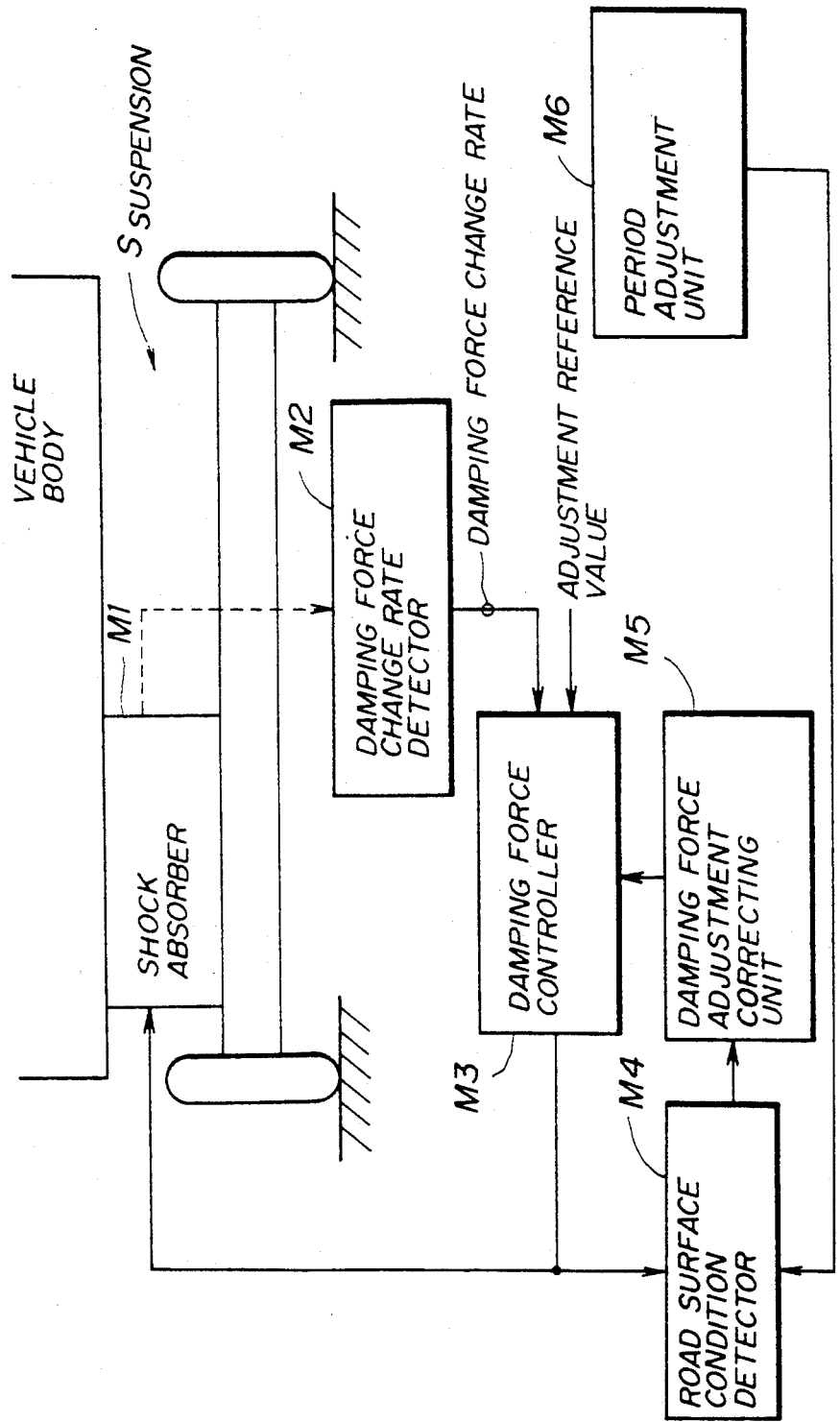
FIG. 1 is a block diagram illustrating the principle of a suspension control system according to a first preferred embodiment of the present invention.

Referring to FIG. 1, there is illustrated the principle of a suspension control system according to a first preferred embodiment of the present invention. A shock absorber M1 is provided in a suspension S of a vehicle and discretely provides different levels of the damping force. A damping force change rate detector M2 detects a rate of change of the damping force of the shock absorber M1. A damping force controller M3 controls the setting of the damping force of the shock absorber M1 on the basis of the difference between the damping force change rate and an adjustment reference value provided for adjusting the level (setting) of the damping force of the shock absorber M1. For example, when the damping force change rate exceeds the adjustment reference value, the shock absorber M1 is altered to a soft state. A road surface condition detector M4 detects, for every first period, a road surface condition on the basis of, for example, a situation where the setting of the damping force is actually altered by the damping force controller M3. Alternatively, it is possible to obtain the road surface condition by calculating the number of times that the damping force change rate exceeds a predetermined reference value (learning reference value) within a predetermined period. A damping force adjustment correcting unit M5 judges the road surface condition for every second period and controls the damping force controller M3 on the basis of the judgment result. For example, the damping force adjustment correcting unit M5 controls the damping force controller M3 so that it becomes easy for the shock absorber M1 to be altered to a soft state from a hard state when it is determined that the vehicle is running on a substantially flat road surface. On the other hand, when it is determined that the vehicle is continuously running on a rough road surface, the damping force adjustment correcting means M5 controls the damping force controller M3 so that it becomes easy for the shock absorber M1 to be altered from the hard state to the soft state. A period adjustment unit M6 adjusts the first period on the basis of the vehicle speed. More specifically, the period adjustment unit M6 decreases the detection interval with an increase of the vehicle speed. Thus, when the vehicle is traveling at a high speed, the road surface condition detector M4 detects the road surface condition for every shortened first period. In response to a decrease in the first period, the damping force adjustment correcting unit M5 judges the road surface condition for every shortened second period and alters the setting of the damping force of the shock absorber M1. As a result, when the vehicle is traveling at high speeds, the damping force is controlled more rapidly, so that riding comfort, driving stability and controllability are improved.

The above-mentioned damping force control is realized by, for example, adjusting the adjustment reference value which is input to the damping force controller M3 in a case where the shock absorber S is capable of stepwise setting the level of the damping force (SOFT and HARD, for example). As will be described, the adjustment of the damping force is achieved by, for example, a learning control which is carried out for every second period on the basis of a parameter related to a change of the damping force of the shock absorber M1 which reflects the road surface condition.

During operation, the road surface detector M4 detects, for every first period, the condition of the road surface condition on which the vehicle is running on the basis of the alteration status of the damping force by the damping force controller M3. For example, if the shock absorber M1 provides two or more discrete levels of damping force, the road surface detector M4 detects the current road surface condition for every first period on the basis of a damping force altering frequency or a damping force altering period at which the damping force of the shock absorber M1 is actually altered to a different level. When the road surface detector M4 determines that the vehicle is continuously running on a substantially flat road surface or a rough road surface, the damping force adjustment correcting unit M5 controls the damping force controller M3 so that it becomes easy for the shock absorber M1 to be altered to the soft state. This is done by correcting the adjustment reference value so that it decreases. On the other hand, if it is determined that the vehicle is continuously running on a rough road surface, the damping force adjustment correcting unit M5 controls the damping force controller M3 so that it becomes easy for the shock absorber M1 to be altered to the hard state. This is done by correcting the adjustment reference value so that it increases. With the above-mentioned damping force control, it becomes possible to prevent the setting of the damping force from being biased to either the soft state or the hard state and thus provide a suspension characteristic having an excellent shock absorbing ability and road holding ability. During the above-mentioned operation, the period adjustment unit M6 adjusts the first period so that it becomes short with an increase in the vehicle speed. Thus, the road surface condition detector M4 more frequently detects the road surface condition as the vehicle speed increases. Thus, riding comfort, the driving stability and controllability obtained at high vehicle speeds can be greatly improved.

If the shock absorber M1 is formed of a shock absorber which continuously provides various levels of the damping force, the damping force adjustment correcting unit M5 controls the damping force controller M3 so that the damping force of the shock absorber M1 is simply increased or decreased on the basis of the detected road surface condition. It is also possible to carry out the above-mentioned damping force control separately for each wheel or separately for a group of two front wheels and a group of two rear wheels. Of course, it is possible to carry out the damping force control in common for all the wheels.

Figure 2:
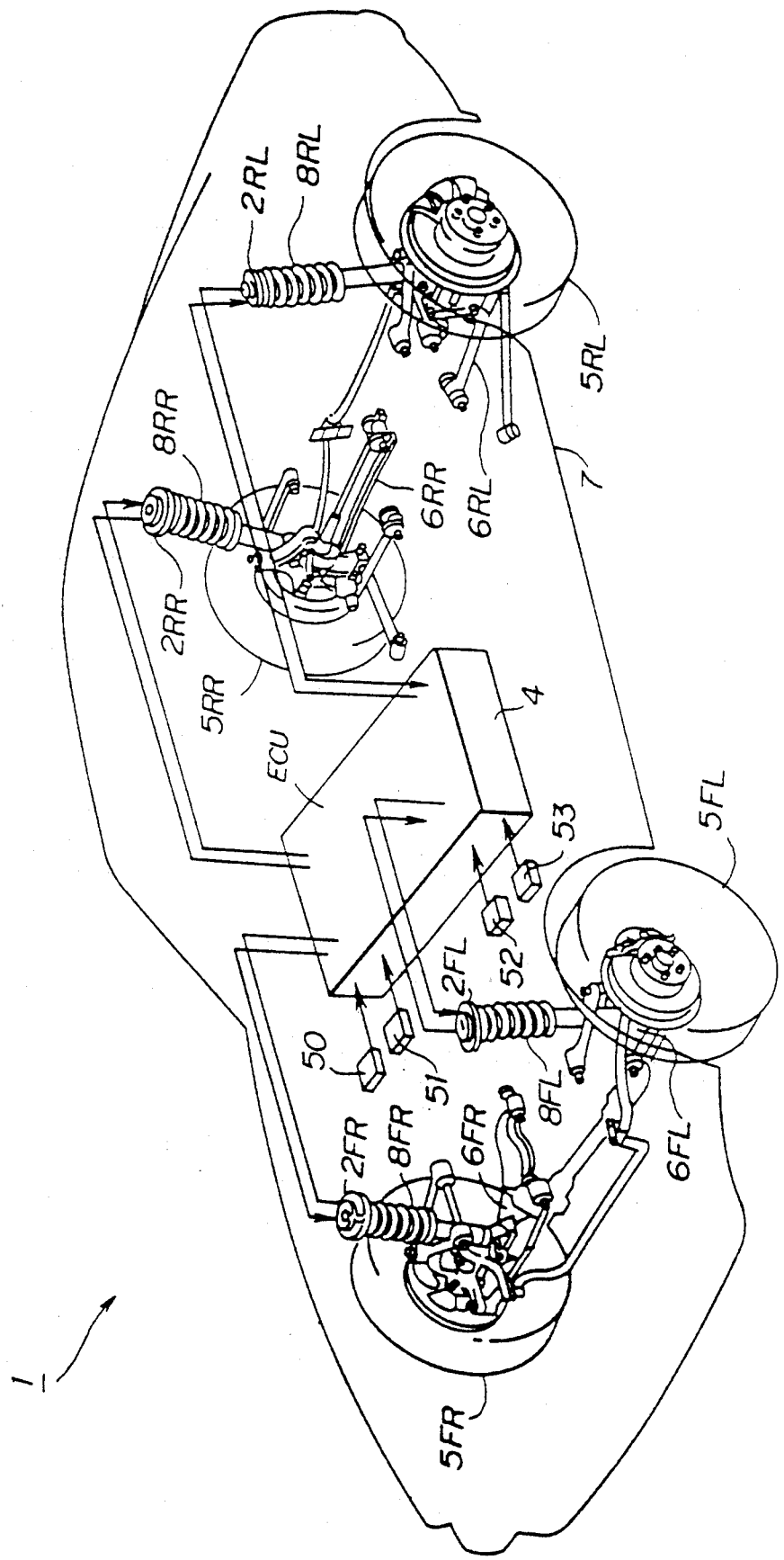
FIG. 2 is a perspective view illustrating a vehicle in which a suspension control system according to the present invention is installed.

A detailed description will now be given of the structure of the first embodiment of the present invention with reference to FIG. 2, which shows that the suspension control system according to the first preferred embodiment of the present invention is applied to variable damping force type shock absorbers 2FL, 2FR, 2RL, 2RR which are suspensions provided in a vehicle 1. The damping force of each of the shock absorbers 2FL, 2FR, 2RL and 2RR is switchable between a first level (soft state) and a second level (hard state). The shock absorber 2FL is provided between a vehicle body 7 and a suspension lower arm 6FL for a left front wheel 5FL. The shock absorber 2FR is provided between vehicle body 7 and a suspension lower arm 6FR for a right front wheel 5FR. The shock absorber 2RL is provided between the vehicle body 7 and a suspension lower arm 6RL for a left rear wheel 5RL. The shock absorber 2RR is provided between the vehicle body 7 and a suspension lower arm 6RR for a right rear wheel 5RR. Each of the shock absorbers 2FL, 2FR, 2RL and 2RR includes a built-in piezoelectric load sensor and a piezoelectric actuator pair. The piezoelectric load sensors in the shock absorbers 2FL, 2FR, 2RL and 2RR detect force exerted on the shock absorbers 2FL, 2FR, 2RL and 2RR, respectively. The piezoelectric actuators in the shock absorbers 2FL, 2FR, 2RL and 2RR function to switch the damping forces thereof between the first level and the second level.

A description will now be given of the shock absorbers 2FL, 2FR, 2RL and 2RR. Since all the shock absorbers 2FL, 2FR, 2RL and 2RR have the same structure, only the shock absorber 5FL provided for the left front wheel is described for the sake of convenience. It will be noted that when there is no difference among the four shock absorbers, suffixes such as FL, FR, RL and RR are omitted.

Figure 3A:
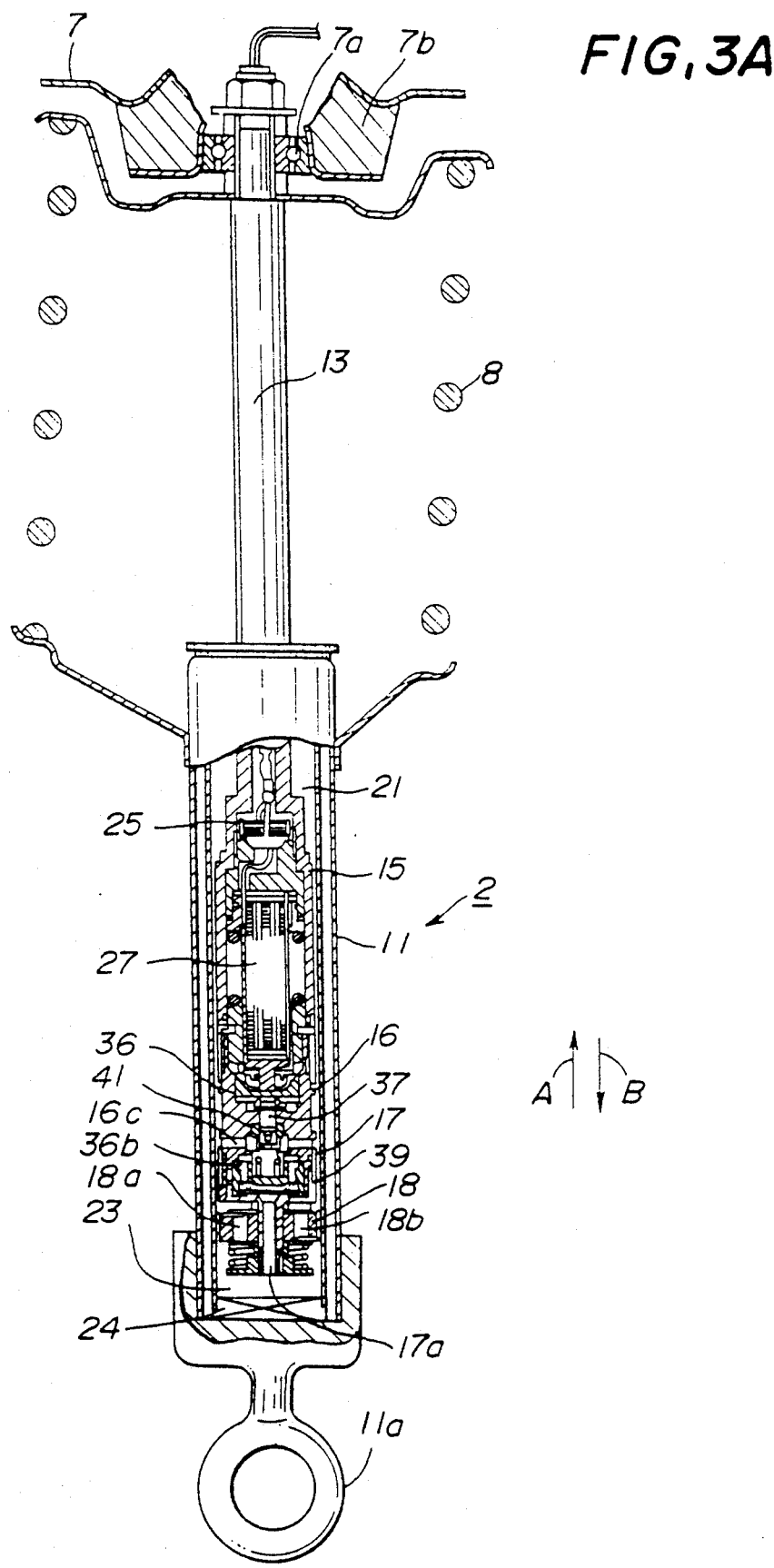
FIG. 3A is a partially sectional view of a shock absorber used in the vehicle shown in FIG. 2.

As shown in FIG. 3A, the shock absorber 2 is fixed to a suspension lower arm 6 through a wheel-shaft-side member 11a at a lower end of a cylinder 11. On the other hand, the shock absorber 2 is fixed, together with a coil spring 8, to the vehicle body 7 through a bearing 7a and a rubber element 7b at an upper end of a rod 13 which penetrates into the cylinder 11. Inside the cylinder 11, there are provided an internal cylinder 15, a connecting member 16 and a cylindrical member 17 which are coupled to the lower end of the rod 13, as well as a main piston 18 which is slidable along an inner surface of the internal cylinder 15. A piezoelectric load sensor 25 and a piezoelectric actuator 27 are accommodated in the internal cylinder 15 connected to the rod 13 of the shock absorber 2.

The main piston 18 is provided outside of the cylindrical member 17 and engages therewith. A seal member 19 is provided between a circumferential outer surface of the main piston 18 and the inner surface of the internal cylinder 15. An internal area of the cylinder 11 is separated into a first fluid room 21 and a second fluid room 23 by the main piston 18. A backup member 28 is provided on the leading end of the cylindrical member 17. The backup member 28 presses a spacer 29 and a leaf valve 30 against the cylindrical member 17 together with the main piston 18. In this state, the spacer 29 and the leaf valve 30 are fixed. A leaf valve 31 and a collar 32 are provided between the backup member 28 and the main piston 18. The leaf valve 31 and the collar 32 are pressed against the backup member 28 and fixed thereto in this state. A main valve 34 and a spring 35 are interposed between the leaf valve 31 and the backup member 28. The main valve 34 and the spring 35 urge the leaf valve 31 toward the main piston 18. A valve 24 selectively connecting a reserver room provided between the internal cylinder 15 and the cylinder 11 is provided on the bottom of the internal cylinder 15.

In a state where the main piston 18 is in a stationary state, the leaf valves 30 and 31 close a expansion-side path 18a and a contraction-side path 18b provided in the main piston 18 on a single side of both the expansion-side path 18a and the contraction-side path 18b. The paths 18a and 18b are opened on respective single sides thereof in accordance with a movement of the main piston 18 indicated by the arrow A or B in FIG. 3A. Thus, fluid filled in the first and second fluid rooms 21 and 23 passes through one of the paths 18a and 18b so that it moves between the first fluid room 21 and the second fluid room 23. In a state where the movement of fluid between the first fluid room 21 and the second fluid room 23 is limited to the movement between the paths 18a and 18b, a damping force generated with respect to the movement of the rod 13 is great so that the characteristic of the suspension is "HARD".

Figure 3B:
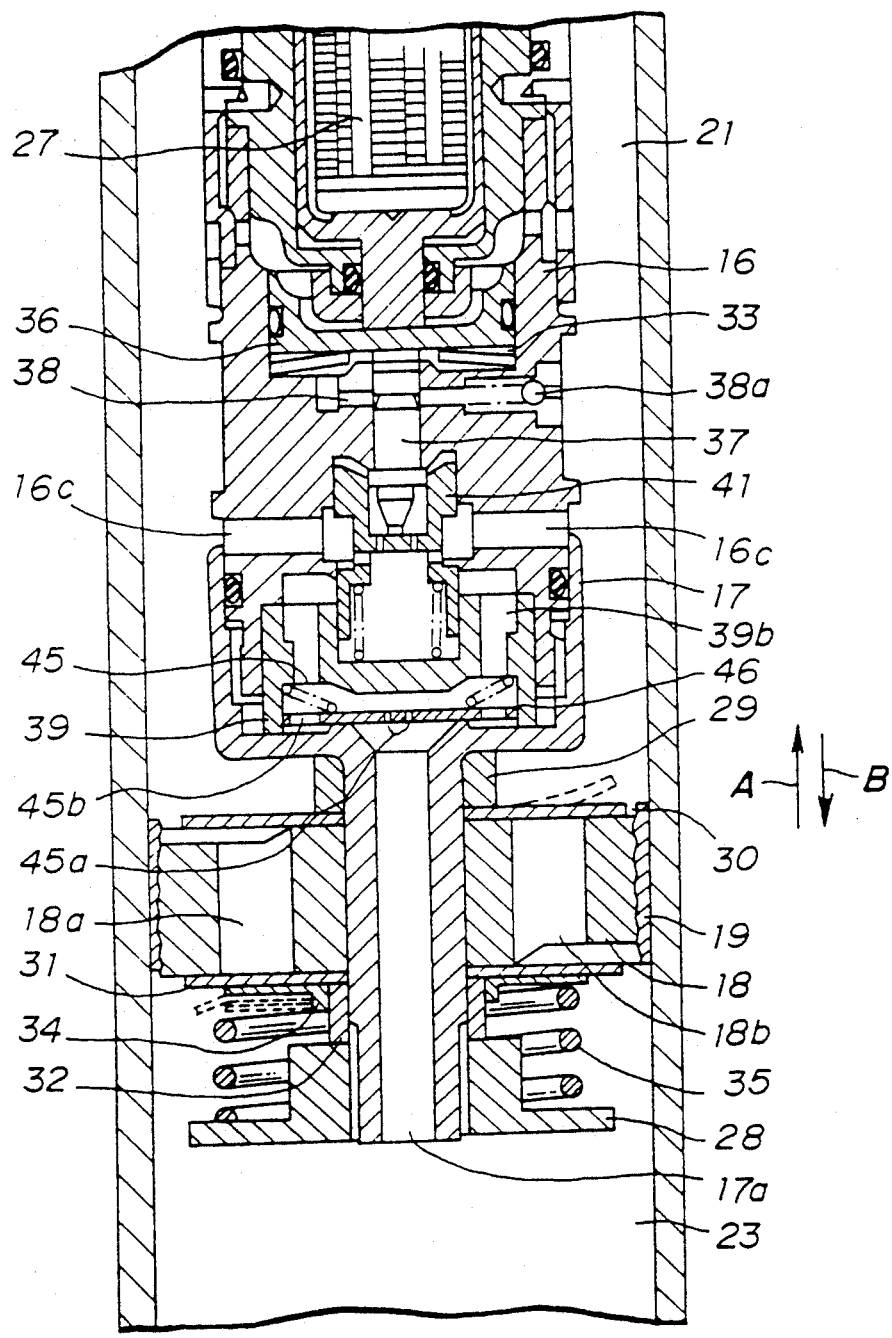
FIG. 3B is an enlarged sectional view of an essential part of the shock absorber shown in FIG. 3A.

As shown in FIGS. 3A and 3B, both the piezoelectric load sensor 25 and the piezoelectric actuator 27 provided inside the connecting member 16 are laminated electrostriction members in which thin plates formed of piezoelectric ceramics are laminated through electrodes. In other words, one electrode is elevationally sandwiched between two adjacent thin plates. Each of the piezoelectric thin plates in the piezoelectric load sensor 25 is polarized due to a force generated in the shock absorber 2, that is, a damping force. An electrical output signal from each of the piezoelectric thin films in the piezoelectric load sensor 25 is supplied to an impedance circuit, which generates a voltage signal. Thus, it is possible to obtain a rate of change in the damping force from the voltage signal related to each of the piezoelectric thin films.

The piezoelectric actuator 27 has laminated electrostriction elements, each of which expands or contracts with a high response characteristic when a high voltage is applied thereto. The piezoelectric actuator 27 directly drives the piston 36. When the piston is moved in the direction indicated by the arrow B shown in FIG. 3B, a plunger 37 and a spool 41 having a substantially H-shaped cross section are moved in the same direction through the movement of oil in an oiltight room 33. When the spool 41 is moved from the position shown in FIG. 3B (original position) in the direction of the arrow B, a sub fluid path 16c connected to the first fluid room 21 and a sub fluid path 39b of a bush 39 connected to the second fluid room 23 become connected to each other. The sub fluid path 39b further becomes connected to a fluid path 17a in the cylindrical member 17 through an oil hole 45a formed in a plate valve 45. Thus, the movement of the spool 41 in the direction of the arrow B causes an increase in the amount of fluid which is transferred between the first fluid room 21 and the second fluid room 23. That is, when the piezoelectric actuator 27 expands because of the high-voltage applied thereto, the shock absorber 2 is altered from the hard state to the soft state. When the piezoelectric actuator 27 is discharged so that no charge is stored therein, the piezoelectric actuator 27 is returned to "HARD".

The degree of movement of the leaf valve 31 provided on the lower surface of the main piston 18 is controlled by the spring 35. An oil hole 45b having a diameter greater than that of the oil hole 45a is formed in the plate valve 45 at a position farther from the center of the plate valve 45 than the oil hole 45a. When the plate valve 45 moves toward the bush 39 against the force by the spring 46, the oil is allowed to move through the oil hole 45b. Thus, the amount of oil obtained when the main piston 18 moves in the direction of the arrow B is greater than that obtained when the main piston 18 moves in the direction of the arrow A, irrespective of the position of the spool 41. That is, the damping force is altered due to the movement direction of the main piston 18 so that the characteristics of the shock absorber can be improved. An oil refilling path 38 is provided together with a check valve 38a between the oiltight room 33 and the first fluid room 21 so that the amount of oil in the oiltight room 33 is fixed. The shock absorber 2 shown in FIGS. 3A and 3B is disclosed in "AUTOMOBILE ENGINEERING MANUAL, FIFTH EDITION", JIDOSHA GIJUTSUKAI, 1983, pp. 4-27 or "TOYOTA CARINA FF NEW MODEL MANUAL", TOYOTA JIDOSHA KABUSHIKI KAISHA, 1985, pp. 4-87.

Figure 4:
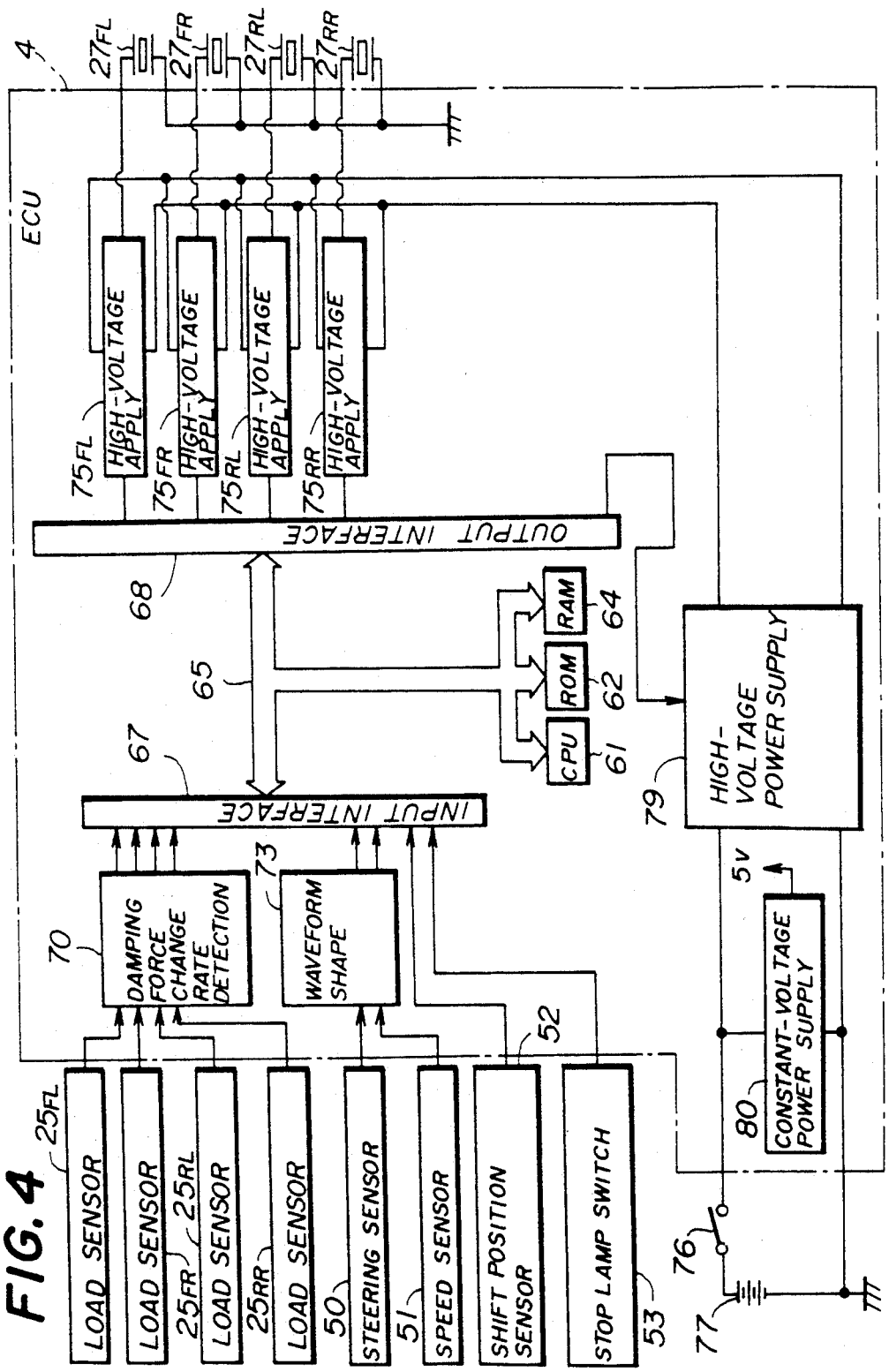
FIG. 4 is a detailed block diagram illustrating the structure of the suspension control system shown in FIG. 1.

A description will now be given of an electronic control unit (hereafter simply referred to a ECU) 4 for switching the damping force of each of the shock absorbers 2 between the first level (soft state) and the second level (hard state) with reference to FIG. 4. In order to detect the driving condition of the vehicle, the following sensors are provided in addition to the piezoelectric load sensors 25FL, 25FR, 25RL and 25RR. A steering sensor 50 detects the steering angle of a steering direction (not shown for the sake of simplicity) and generates a detection signal which indicates the current steering angle. A vehicle speed sensor 51 outputs a series of pulses having a number proportional to the current vehicle speed. A shift position sensor 52 detects the current shift position of a change gear (not shown) and generates a detection signal which indicates the current shift position. A stop lamp switch 53 generates a detection signal when a brake pedal is stepped on. The output signals from the above-mentioned sensors are input to the ECU 4. The ECU 4 generates output signals individually supplied to high-voltage application currents 75FL, 75FR, 75RL and 75RR, which drive the piezoelectric actuators 27FL, 27FR, 27RL and 27RR, respectively.

The ECU 4 includes a central processing unit (hereafter simply referred to as a CPU) 61, a read only memory (ROM) 62 and a random access memory (RAM) 64, all of which are connected to a common bus 65. An input interface circuit 67 and an output interface circuit 68 are connected to the common bus 65.

The ECU 4 further includes a damping force change rate detection circuit 70, a waveform-shaping circuit 73, high-voltage application circuits 75FL, 75FR, 75RL and 75RR, an ignition switch 76, a battery 77, a high-voltage power supply circuit 79 and a constant-voltage power supply circuit 80.

The damping force change rate detection circuit 70 has four detection circuits (not shown) respectively provided for the piezoelectric load sensors 25FL, 25FR, 25RL and 25RR. Each of the detection circuits receives the detection signal (a voltage signal V) supplied from the corresponding piezoelectric load sensor 25, and generates an output signal which corresponds to the voltage signal V and which indicates the damping force change rate. As has been described previously, the detection signal from each of the piezoelectric sensors 25FL, 25FR, 25RL and 25RR varies in accordance with the charge amount which is charged into or discharged from each of the piezoelectric thin films. The input interface circuit 67 includes an analog-to-digital converter (not shown), which converts the damping force detection signal in analog from into a digital signal. The waveform shaping circuit 73 shapes the waveforms of the detection signals from the steering sensor 50 and the vehicle speed sensor 51 into waveforms appropriate to signal processings executed by the CPU 61, such as pulse waveforms. The detection signals output by the shift position sensor 52 and the stop lamp switch 53 are input directly to the input interface circuit 67.

The high-voltage application circuits 75FL, 75FR, 75RL and 75RR are connected to the piezoelectric actuators 27FL, 27FR, 27RL and 27RR (FIG. 4), respectively. The high-voltage power supply circuit 79 is a switching regulator type circuit, and generates high voltages, +500 volts and −100 volts. Each of the high-voltage application circuits 75FL, 75FR, 75RL and 75RR applies a voltage of +500 volts or −100 volts to the corresponding piezoelectric actuator 27 in accordance with a control signal from the CPU 61. When a voltage of +500 volts is applied to the corresponding piezoelectric actuator, it expands. On the other hand, when a voltage of −100 volts is applied to the corresponding piezoelectric actuator, it contracts. Thereby, the oil amount is switched so that the shock absorber 2 is altered to the soft state or the hard state. That is, when the piezoelectric actuator 27 is expanded by the application of a voltage of +500 volts, an increased amount of fluid passes between the first fluid room 21 and the second fluid room 23 in the shock absorber 2 so that the damping force is decreased. On the other hand, when the piezoelectric actuator 27 is contracted by the application of a voltage of −100 volts, a decreased amount of fluid passes between the first fluid room 21 and the second fluid room 23 so that the damping force is increased. The constant voltage power supply circuit 80 converts the voltage of the battery 77 into an operating voltage (5 volts for example).

Figure 5:
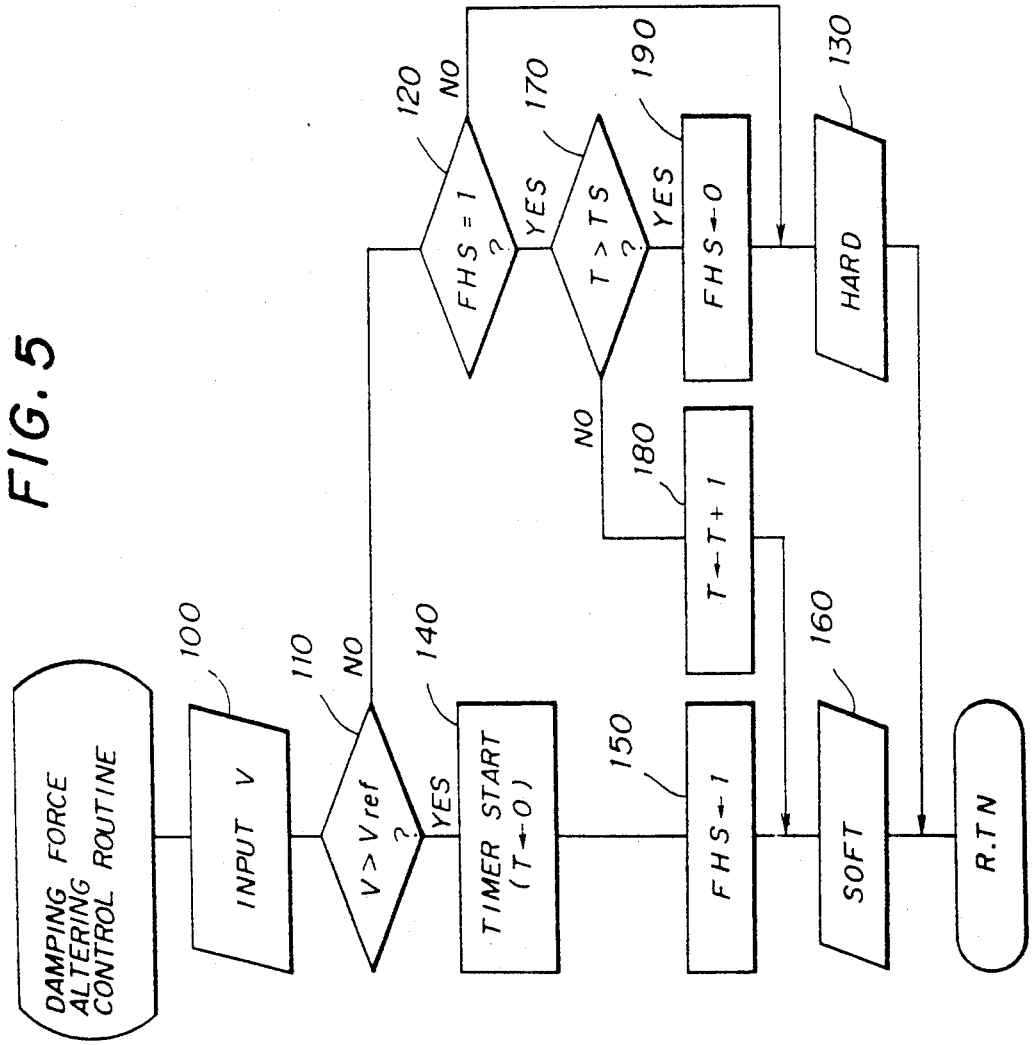
FIGS. 5, 6 and 7 are respectively flowcharts illustrating the operation of the suspension control system according to the first preferred embodiment.
Figure 6:
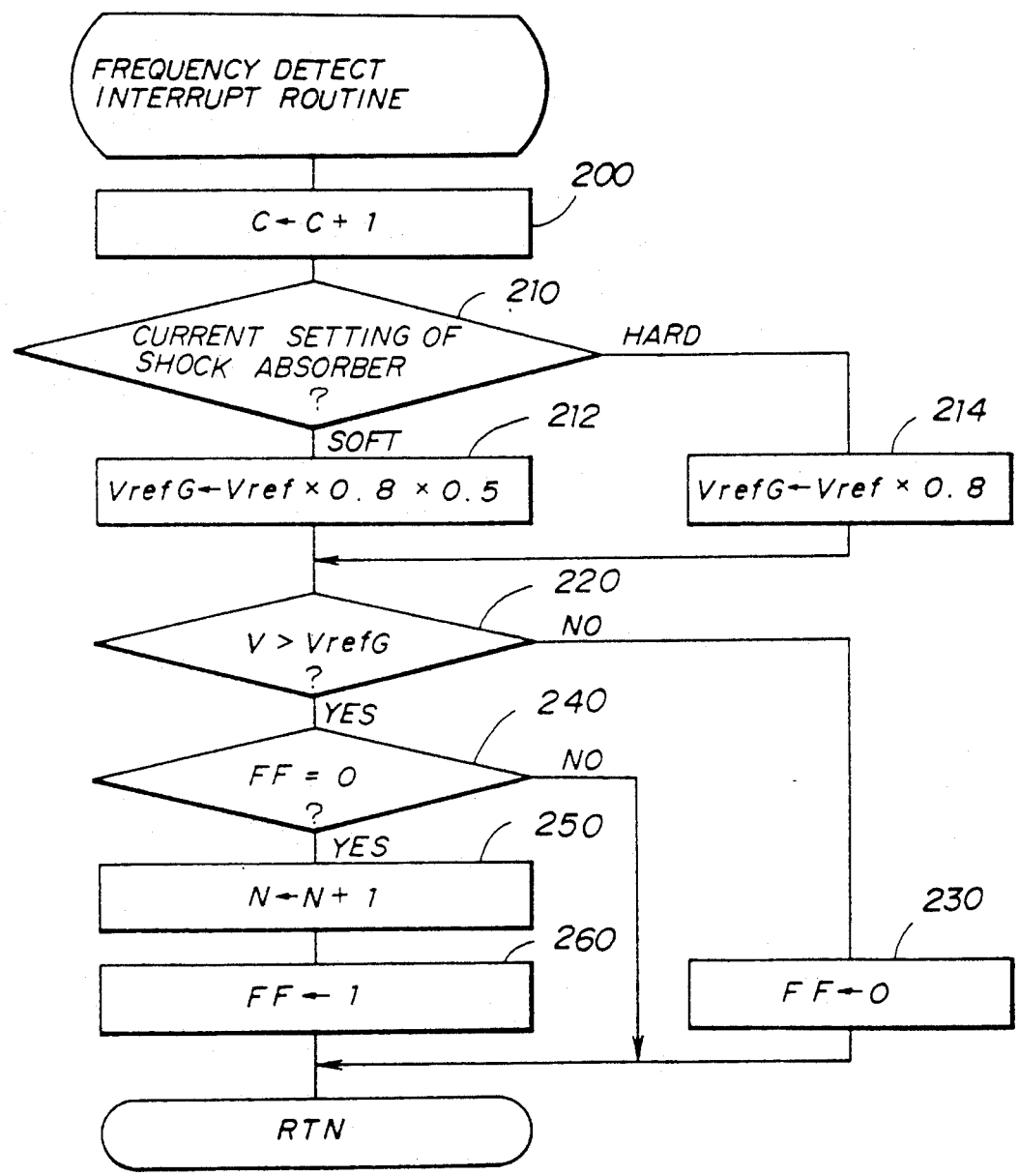
Figure 7:
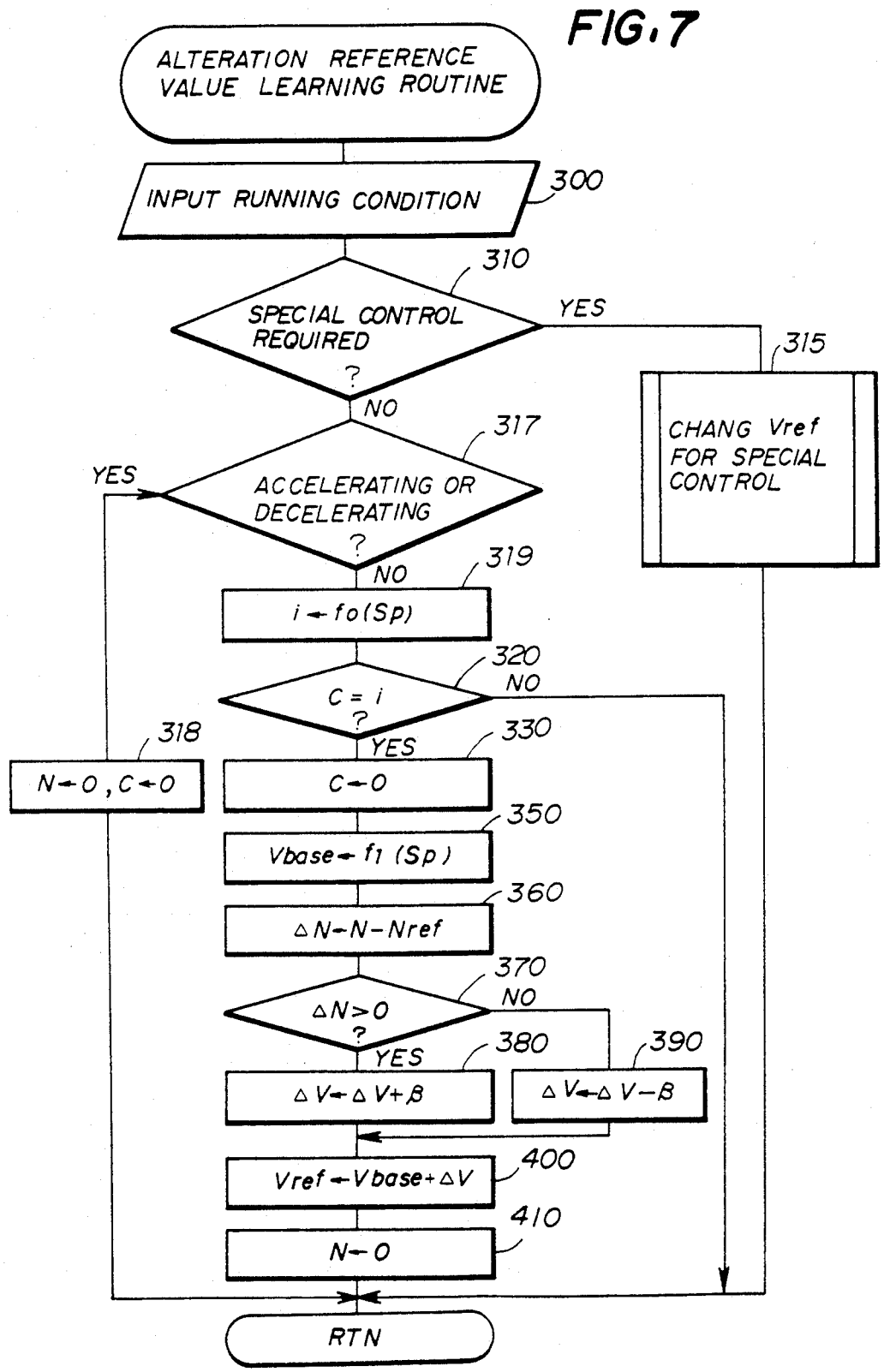

A description will now be given of a damping force control executed by the suspension control system according to the first preferred embodiment of the present invention, with reference to FIGS. 5, 6 and 7. The procedures shown in FIGS. 5, 6 and 7 are carried out separately for each of the shock absorbers 2FL, 2FR, 2RL and 2RR at predetermined intervals. The following description is applicable to any one of the shock absorbers 2FL, 2FR, 2RL and 2RR, as all the shock absorbers are controlled in the same way.

FIG. 5 illustrates a damping force altering control procedure (routine) for switching the setting of the damping force between the low level (soft) and the high level (hard) by changing the status of the piezoelectric actuator 27 on the basis of the damping force change rate V. FIG. 6. illustrates a frequency detection interrupt procedure (routine) for detecting the number of times that the damping force change rate exceeds a learning reference value VrefG within a predetermined period and for outputting, as information on a frequency N, the detected number of times. FIG. 7 illustrates an alteration reference value learning procedure (routine) for learning an alteration reference value Vref used for actually altering the level (setting) of the damping force on the basis of the frequency N. It will be noted that the alteration reference value Vref corresponds to the aforementioned adjustment reference value.

The procedures shown in FIGS. 6 and 7 learn the alteration reference value Vref (VrefG) by referring to a variable C provided for measuring the predetermined period as well as the frequency N. The procedure shown in FIG. 5 actually alters the setting of the damping force by using the learned alteration reference value Vref.

Referring to FIG. 5, the procedure commences with step 100, at which step the CPU 61 (FIG. 4) inputs the damping force change rate V regarding each shock absorber 2 from the damping force change rate detection circuit 70 via the input interface circuit 67. Next, at step 110, the CPU 61 discerns whether or not the damping force change rate V is greater than the alteration reference value Vref which is learned by the procedure shown in FIG. 7. When the result at step 110 is NO, that is, when the damping force change rate V is equal to or less than the alteration reference value Vref, the CPU 61 determines, at step 120, whether or not a flag FHS indicating that the suspension is set to the soft state is equal to 1. When the result obtained at step 120 is NO, at step 130, the CPU 61 controls the suspension so that it is altered to the hard state, and ends the procedure. It will be noted that immediately after the damping force of the shock absorber 2 is altered from the low level (soft state) to the high level (hard state), the output interface circuit 68 controls the corresponding high-voltage application circuit 75 under the control of the CPU 61 so that a voltage of −100 volts is applied to the corresponding piezoelectric actuator 27 so that it is contracted. If the corresponding piezoelectric actuator 27 is in the contracted state, the piezoelectric actuator 27 is maintained in this state.

On the other hand, when it is determined, at step 110, that the damping force change rate V is greater than the alteration reference value Vref, the CPU 61 resets a timer variable T to zero at step 140. At step 150 subsequent to step 140, the CPU 61 sets the flag FHS to 1, which represents that the suspension should be set to the soft state. At step 160, under the control of the CPU 61, the output interface circuit 68 controls the corresponding high-voltage application circuit 75 so that it applies a voltage of +500 volts to the corresponding piezoelectric actuator 27 so that the damping force of the shock absorber 2 is set to the low level (soft). Then, the procedure is terminated.

If the damping force change rate V is greater than the alteration reference value Vref after the damping force of the shock absorber 2 is altered to the low level, a sequence of steps 140, 150 and 160 is repeatedly carried out. When it is determined, at step 10, that the damping force change rate V has become equal to or less than the alteration reference value Vref, the CPU 61 checks the status of the flag FHS at step 120, and determines, at step 170, whether or not the timer variable T exceeds a predetermined reference value TS. The reference value TS is provided for maintaining the shock absorber 2 at the low level for a predetermined time after it is altered to the low level. If the timer variable T is equal to or less than the reference value TS, the CPU 61 increments the timer variable T by +1 and executes step 160. Thus, the suspension is maintained in the soft state.

If the damping force change rate V is always equal to or less than the alteration reference value Vref for the predetermined time (which corresponds to TS) after the damping force change rate V becomes equal to or less than the alteration reference value Vref, the determination result obtained at step 170 becomes YES. Then, the CPU 61 resets the flag FHS to zero at step 190, and controls the shock absorber 2 so that it provides the high-level damping force (hard state) at step 130.

While the procedure shown in FIG. 5 is repeatedly carried out, the damping force of the shock absorber 2 is altered to the low level immediately after the damping force change rate V exceeds the alteration reference value Vref, and maintained at the low level for the predetermined time corresponding to TS. When the predetermined time TS elapses in the state where the damping force change rate V is equal to or less than the alteration reference value Vref, the damping force is altered to the high level.

A description will now be given of the interrupt procedure (FIG. 6) for detecting the frequency N used for determining the alteration reference value Vref, which value is referred to during the procedure shown in FIG. 5. The procedure shown in FIG. 6 commences with step 200, at which step the CPU 61 increments the aforementioned variable C by +1. The variable C indicates the number of times that the procedure shown in FIG. 6 is activated. At subsequent step 210, the CPU 61 discerns whether the suspension is in the soft state or hard state. It will be noted that the setting of the damping force of the shock absorber 2 is actually altered by the aforementioned procedure shown in FIG. 5. When it is determined, at step 210, that the current status of the shock absorber 2 is in the low level (soft state), at step 212, the CPU 61 multiplies the current alteration reference value Vref by 0.8×0.5 and inserts Vref×0.8×0.5 into the learning reference value VrefG. On the other hand, when it is determined, at step 210, that the current status of the shock absorber 2 is in the high level (hard state), at step 214, the CPU 61 multiplies the current alteration reference value Vref by 0.8 and inserts Vref×0.8 into the learning reference value VrefG. The above-mentioned coefficients to be multiplied by the alteration reference values are not limited to 0.8×0.5 and 0.8, but arbitrarily selected on the basis of experimental results.

After the learning reference value VrefG is respectively obtained for both the hard and soft states in the above-mentioned way, the CPU 61 determines, at step 220, whether or not the current damping force change rate V is greater than the learning reference value VrefG. If the current damping force change rate V is equal to or lower than the learning reference value VrefG, the CPU 61 resets a flag FF to zero at step 230, and then ends the procedure shown in FIG. 6. The flag FF indicates whether or not the current damping force change rate V is greater than the alteration reference value Vref.

On the other hand, when it is determined, at step 220, that the current damping force change rate V is greater than the learning reference value VrefG, the CPU 61 checks the value of the flag FF at step 240. When it is determined, at step 240, that the flag FF is equal to zero, that is, immediately after the current damping force change rate V has become greater than the learning reference value VrefG, the CPU 61 increments the frequency N by +1 at step 250, and then sets the flag FF to 1 at step 260. Then, the procedure shown in FIG. 6 is ended. In this manner, the frequency N is incremented by +1 only immediately after the damping force change rate V has become greater than the learning reference value VrefG. That is, the frequency N is not increased until the damping force change rate V becomes equal to or less than the alteration reference value VrefG and then becomes greater than the alteration reference value VrefG again.

The procedure shown in FIG. 6 is repeatedly carried out so that the learning reference value VrefG is renewed on the basis of the alteration reference value Vref, and the frequency N at which the damping force change rate V becomes greater than the learning reference value VrefG within the predetermined period is obtained.

The alteration reference value learning procedure (routine) will now be explained with reference to FIG. 7. The procedure shown in FIG. 7 commences with step 300, at which step the CPU 61 inputs the signals from the steering sensor 50, the speed sensor 51 and the stop lamp switch 53 via the input interface circuit 67. At subsequent step 310, the CPU 61 obtains the current driving condition from the input signals, and determines, from the obtained current driving condition, whether or not a special control, such as an anti-dive control or an anti-roll control, should be carried out. For example, when the vehicle is being braked or rapidly turned, the CPU 61 concludes that a special control should be carried out. In this case, the CPU 61 changes the alteration reference value Vref to an optimum value suitable for the special control at step 315. After that, the procedure shown in FIG. 7 is ended.

On the other hand, when it is determined, at step 310, that the above-mentioned special control is not needed, the CPU 61 determines, at step 317, whether or not the vehicle is being accelerated or decelerated on the basis of, for example, the rate of a change of the vehicle speed, the status of an accelerator pedal operated by the driver and/or the status of a brake pedal operated by the driver. When it is determined, at step 317, that the vehicle is being accelerated or decelerated, the frequency N and the variable C are cleared, and the CPU 61 ends the procedure. That is, the learning control of the alteration reference value Vref is stopped and initialized. This is based on the fact that under a transient condition such that the vehicle is being accelerated or decelerated, it is difficult to accurately judge the road surface condition and thus precisely carry out the learning control of the alteration reference value Vref.

Figure 8:
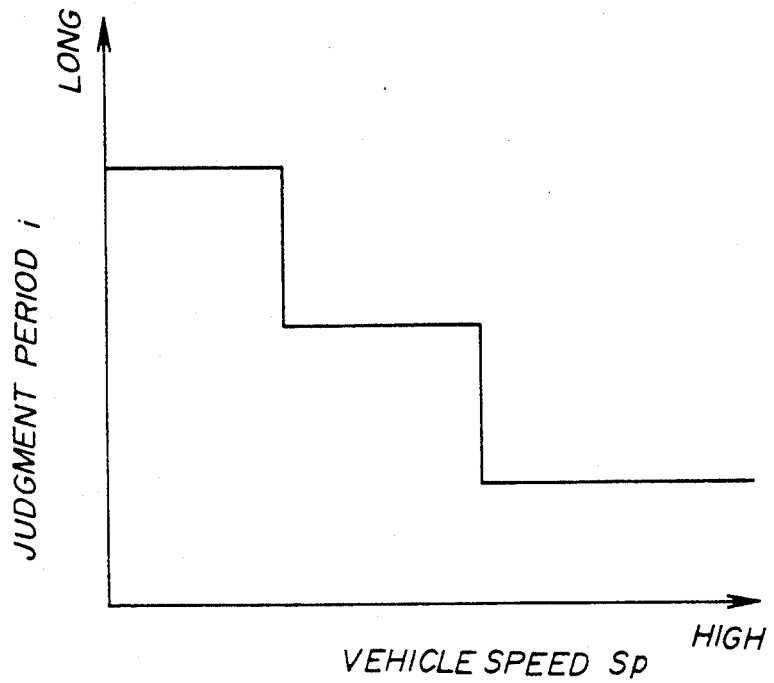
FIG. 8 is a graph illustrating the relationship between a judgment period and a vehicle speed.

On the other hand, when it is determined, at step 317, that the vehicle is not being accelerated or decelerated, the CPU 61 renews, at step 319, a parameter i indicating a judgment time period on the basis of a function of the vehicle speed Sp, fo(Sp). As shown in FIG. 8, the judgment period i decreases stepwise with an increase in the vehicle speed Sp. Alternatively, it is possible to continuously decrease the judgment period i with an increase in the vehicle speed Sp.

At step 320 subsequent to step 319, the CPU 61 judges whether or not the variable C has become equal to the judgment period i. The variable C is incremented by +1 each time the procedure shown in FIG. 6 is executed. The variable C is provided for determining whether or not the (predetermined) time necessary to obtain the frequency N has elapsed. The procedure shown in FIG. 7 is ended if the number of times that the procedure shown in FIG. 6 has repeatedly been carried out is small (C<i), so that the time necessary to obtain the frequency N has not yet elapsed.

The determination result at step 320 becomes YES each time the procedure shown in FIG. 6 is carried out i times. In this case, the learning control of the alteration reference value Vref starting from step 330 is carried out. As has been described previously, the judgment period i is shortened as the vehicle speed increases, so that the learning control of the alteration reference value Vref is carried out more frequently.

Figure 9:
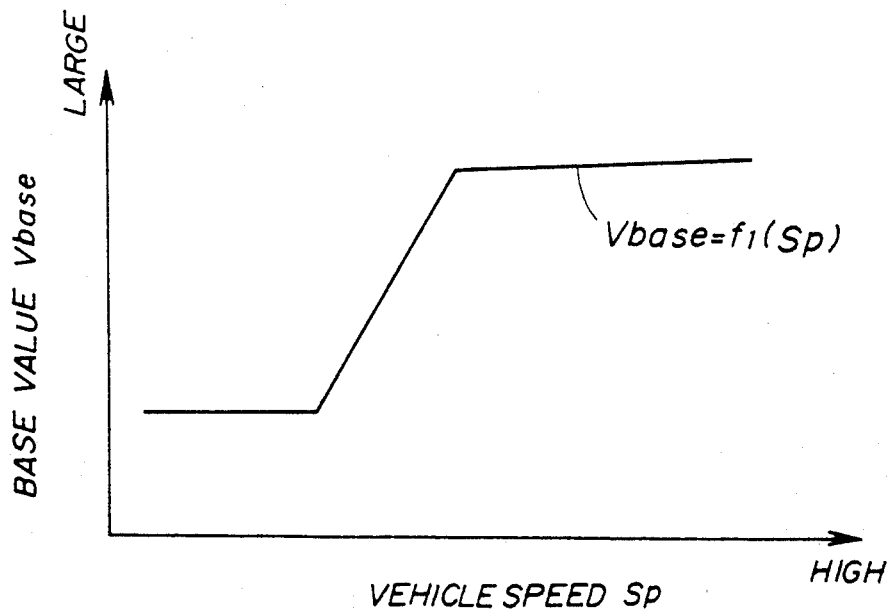
FIG. 9 is a graph illustrating the relationship between a base value and a vehicle speed.

When the result at step 320 is YES, the CPU 61 resets the variable C to zero at step 330, and inputs a current vehicle speed Sp at step 340 via the input interface circuit 67. At step 350, the CPU 61 calculates a base value Vbase from the vehicle speed Sp. The base value Vbase is used for adjusting the alteration reference value Vref in accordance with the vehicle speed Sp. As shown in FIG. 9, the base value Vbase is a function of the vehicle speed Sp, $f_1(Sp)$. As also shown in FIG. 9, the base value Vbase is increased with an increase in the vehicle speed Sp.

Turning now to FIG. 7, at step 360, the CPU 61 calculates a frequency deviation $\Delta N$ between the frequency N obtained by the procedure shown in FIG. 6 and a target frequency Nref. At step 370, the CPU 61 discerns whether or not the frequency deviation $\Delta N$ is greater than 0. When the frequency deviation $\Delta N$ is greater than 0, a learning correction value $\Delta V$ is incremented by $\beta$ at step 380. On the other hand, when the frequency deviation $\Delta N$ is equal to or less than 0, the learning correction value $\Delta V$ is decremented by $\beta$ at step 390. The learning correction value $\Delta V$ thus calculated is added to the base value Vbase at step 400 so that the alteration reference value Vref is obtained. In this way, the alteration reference value Vref is learned and adjusted on the basis of the vehicle speed Sp. It will be noted that the learning correction value $\Delta V$ is also learned and the learning correction value $\Delta V$ obtained by the learning is stored in the RAM 64, for example, and used in the future control. At step 410 subsequent to step 400, the CPU 61 resets the frequency N to 0 so that it is ready for the next frequency calculation procedure. After that, the procedure shown in FIG. 7 is ended.

By executing the procedures shown in FIGS. 5, 6 and 7, the setting of the damping force of each shock absorber 2 is controlled as follows.

Figure 10A:
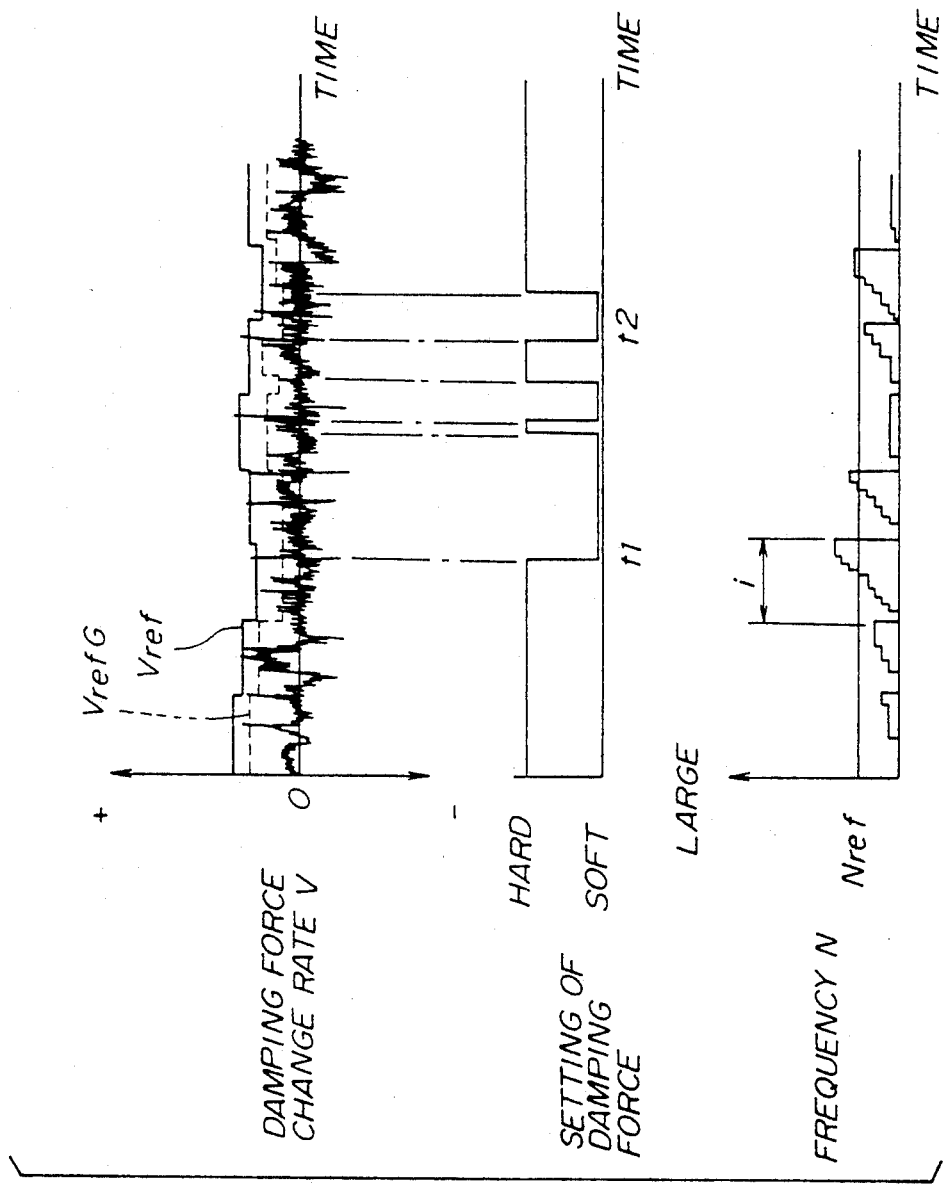
FIG. 10A is a diagram illustrating how the suspension control system according to the first preferred embodiment of the present invention operates when the vehicle is continuously running on a substantially flat road surface.

Referring to FIG. 10A, there is illustrated an example of the damping force control while the vehicle is continuously running on a flat road surface. In this case, the damping force change rate V does not change greatly, and the damping force of the shock absorber 2 is maintained at the high level (hard state). At this time, the learning reference value VrefG is equal to 80% of the alteration reference value Vref at step 214 shown in FIG. 6. Thus, the frequency N at which the damping force change rate V exceeds the learning reference value VrefG within the predetermined period (which corresponds to the count value i) is low. Thus, the alteration reference value Vref is learned at step 390 so that it is decremented by $\beta$ each time it is determined that $\Delta N \leq 0$ at step 370 shown in FIG. 7. As a result, it becomes easy for the damping force change rate V to exceed the alteration reference value Vref. Thus, the damping force of the shock absorber 2 is altered to the low level due to the presence of a minor road surface roughness at times $t_1$ and $t_2$ shown in FIG. 10A, even when the vehicle is running on the flat road surface. As the alteration reference value Vref becomes small at step 212 (FIG. 6), the learning reference value VrefG also becomes small, so that the frequency N at which the damping force change value V exceeds the learning reference value VrefG within the predetermined period becomes high. As a result, the alteration reference value Vref is incremented by $+\beta$. As the above-mentioned procedure is repeatedly carried out, the alteration reference value Vref is learned so that it becomes equal to an appropriate value at which the frequency deviation $\Delta N$ becomes approximately zero.

Thus, when the vehicle is running on the flat road surface and the damping force change rate V is low so that the suspension has a tendency to be set to the hard state, the alteration reference value Vref is gradually decreased by the detection of the frequency N, the renewal of the alteration reference value Vref and the learning of the learning reference value VrefG. As a result, it becomes easy to alter the damping force of the shock absorber 2 to the low level, that is, alter the suspension to the soft state. Thus, it becomes possible to absorb a vibration caused by minor roughness on a continuously flat road surface, so that riding comfort is improved.

Figure 10B:
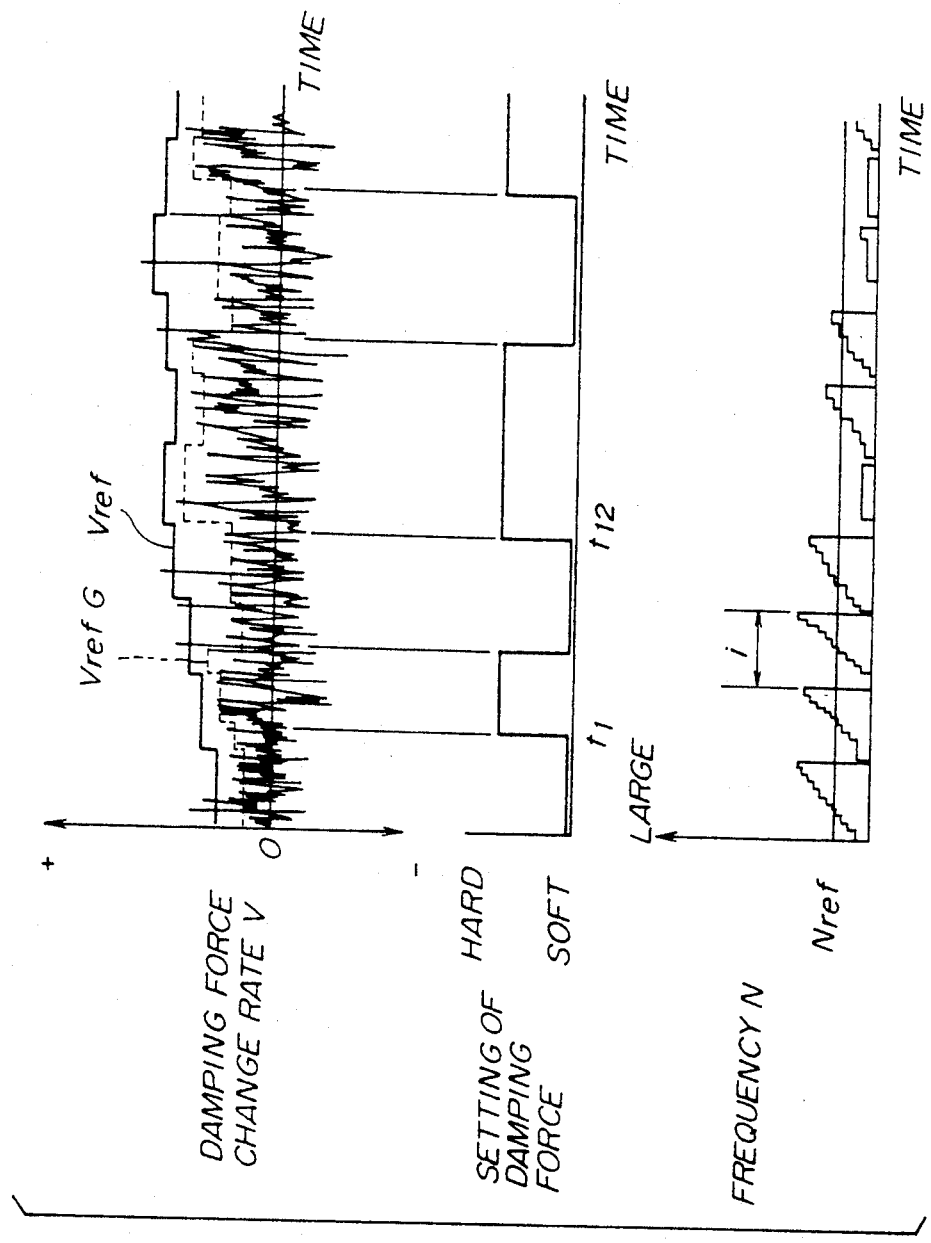
FIG. 10B is a diagram illustrating how the suspension control system according to the first preferred embodiment of the present invention operates when the vehicle is continuously running on a rough road surface.

On the other hand, when the vehicle is running on a rough road surface, as shown in FIG. 10B, the damping force change rate V changes greatly and the suspension is maintained in the soft state. During this time, the learning reference value VrefG is set equal to 40% of the alteration reference value Vref at step 212 shown in FIG. 6. Thus, the frequency N at which the damping force change rate V exceeds the alteration reference value Vref within the predetermined period (which corresponds to the count value i) is high. As a result, the alteration reference value Vref is incremented by $\beta$ at step 380 each time it is determined that $\Delta N > 0$. Thus, it gradually becomes difficult for the damping force change rate V to exceed the alteration reference value Vref, so that the damping force is altered to the high level (hard state) at times $t_{11}$ and $t_{12}$ shown in FIG. 10B, even when the vehicle is running on the rough road surface. As the alteration reference value Vref is increased in the above-mentioned way, the learning reference value VrefG is also increased. Thus, the frequency N at which the damping force change rate V exceeds the learning reference value VrefG becomes low. As a result, the alteration reference value Vref is renewed so that it is decreased by $\beta$. As the above-mentioned procedure is repeatedly carried out, the alteration reference value Vref is learned so that it becomes equal to an appropriate value at which the frequency deviation $\Delta N$ is approximately zero.

Thus, even when the vehicle is running on the rough road surface and the damping force change rate V is high so that the suspension has a tendency to be set to the hard state, the alteration reference value Vref is gradually increased in accordance with the detection of the frequency N, the renewal of the alteration reference value Vref and learning of the learning reference value VrefG. As a result, it becomes easy to alter the damping force of the shock absorber 2 to the high level, that is, alter the suspension to the hard state. Thus, it becomes possible to reduce deterioration of the road holding characteristic caused by a continuously rough road surface, so that driving stability and controllability can be improved.

Figure 11:
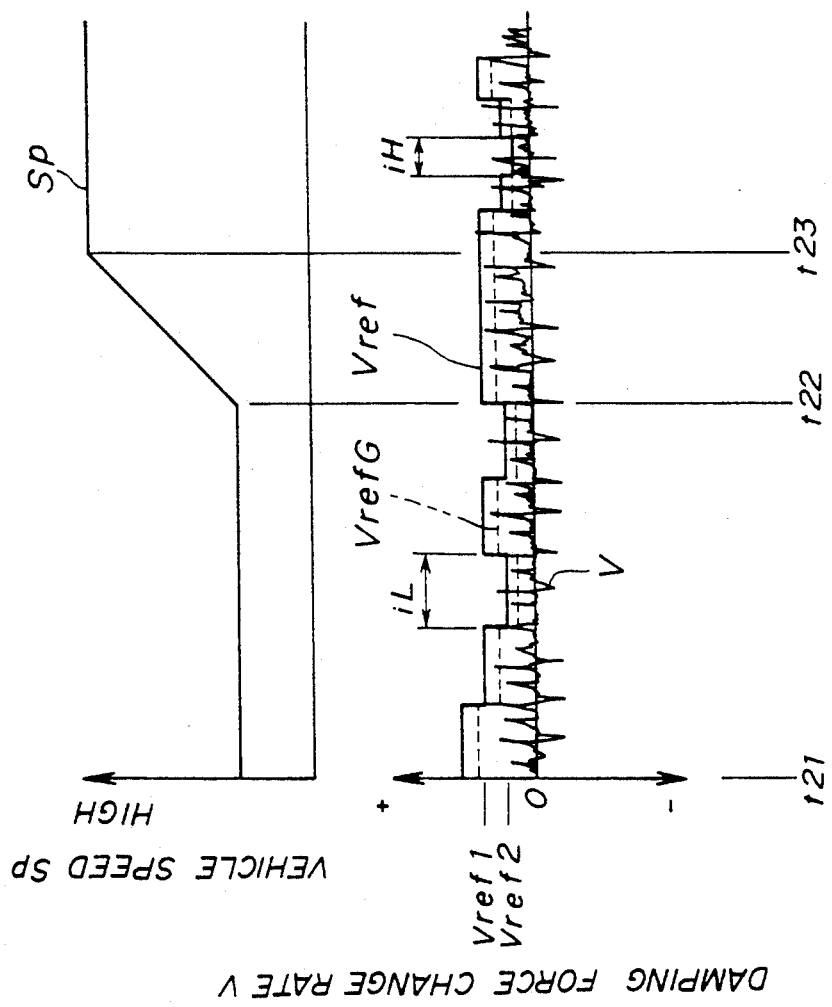
FIG. 11 is a diagram illustrating how the judgment period is adjusted on the basis of the vehicle speed according to the first preferred embodiment of the present invention.

FIG. 11 illustrates the relationship between the vehicle speed Sp and time as well as that between the alteration reference value Vref and time which are obtained when the vehicle is traveling on a continuous flat road surface. When the vehicle is traveling at a low speed between times $t_{21}$ and $t_{22}$, the learning control of the alteration reference value Vref is carried out for a relatively long judgment period iL, and the alteration reference value Vref is set to an appropriate value which is the mean of values Vref1 and Vref2.

The driver steps on the accelerator pedal and the vehicle is being accelerated between times $t_{22}$ and $t_{23}$. In the state where the vehicle is being accelerated, the alteration reference value Vref is not changed but instead maintained at a value obtained immediately before the acceleration (steps 317 and 318 shown in FIG. 7). Then the accelerating state ends and the vehicle starts to travel at a constant high speed at time $t_{23}$. While the vehicle is traveling at the constant high speed, the damping force change rate V changes frequently, as compared with the aforementioned case where the vehicle is traveling at the low speed (between times $t_{21}$ and $t_{22}$). That is, the vehicle which is traveling at a constant high speed has a short-term vehicle vibration. This is due to the fact that the vehicle moves a longer distance within a constant time period as the vehicle speed increases and thus the number of times that the vehicle runs on rough road surface portions increases. It should be noted that according to the first embodiment of the present invention, the judgment period i is set to a short judgment period iH when the vehicle is traveling at high speeds. Thus, the learning control of the alteration reference value Vref is carried out at short intervals, so that the alteration reference value Vref can be set to an appropriate value which is the mean of the values Vref1 and Vref2. The above holds true for a case where the vehicle is traveling on a continuous rough road surface.

According to the above-mentioned first embodiment of the present invention, it becomes possible to absorb a small vehicle body vibration caused when the vehicle is traveling on a continuous flat road surface and improve the road holding characteristic which is deteriorated when the vehicle is traveling on a continuously rough road surface, so that riding comfort, driving stability and controllability are improved.

Since the judgment period i is switchable among a plurality of different values, it is possible to accurately judge the road surface condition irrespective of the vehicle speed Sp. As a result, the suspension control system according to the first preferred embodiment of the present invention can always control each suspension on the basis of an optimum reference value Vref based on the road surface condition.

When the vehicle is being accelerated or decelerated, the learning control of the alteration reference value Vref is stopped. Thus, it is possible to prevent the learning control of the alteration reference value Vref from being carried out under a transient condition. As a result, there is no possibility that the alteration reference value Vref obtained when the vehicle is released from the transient condition will be greatly different from an appropriate value. Hence, it becomes possible to smoothly and rapidly start the learning control when the vehicle starts to move in the normal running condition.

Figure 12:
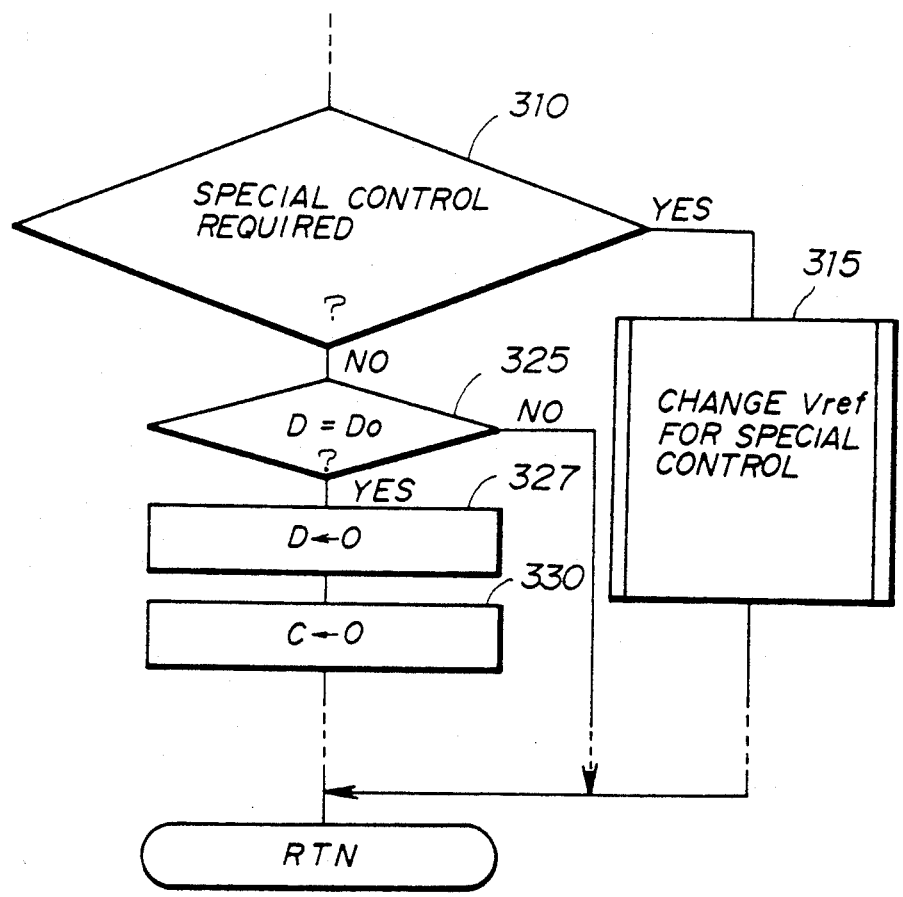
FIG. 12 is a flowchart of an essential feature of a suspension control system according to a second preferred embodiment of the present invention.

A description will now be given of a suspension control system according to a second preferred embodiment of the present invention with reference to FIG. 12. The second embodiment of the present invention is the same as the first embodiment of the present invention except that, as shown in FIG. 12, steps 325 and 327 are substituted for steps 317–320 shown in FIG. 7. When it is determined, at step 310 shown in FIG. 12, that a special control such as the anti-dive control is not needed, the CPU 61 determines, at step 325, whether or not an accumulated distance D, indicating a distance which the vehicle has gone since the immediately previous (latest) control has become equal to a fixed reference distance Do. When the determination result at step 325 is NO, the process shown in FIG. 12 ends. On the other hand, when the determination result is YES, the process proceeds to step 327, at which step the CPU 61 resets the accumulated distance D to zero. Then, the learning control of the alteration reference value Vref is carried out. The accumulated distance D is obtained by, for example, integrating the vehicle speed Sp.

According to the second embodiment of the present invention, the learning control of the alteration reference value Vref based on the road surface condition is carried out each time the vehicle has gone the predetermined distance Do. Thus, it is possible to maintain the alteration reference value Vref at an appropriate value irrespective of the vehicle speed Sp. In addition, by learning the alteration reference value Vref on the basis of the distance, it becomes possible to suitably control the shock absorbers under a transient state such as the accelerating or decelerating state.

It will be noted that it is possible to modify the relationship between the judgment period i and the vehicle speed Sp used in the aforementioned first embodiment of the present invention so that the judgment period i decreases linearly as the vehicle speed Sp increases. In this case, by setting the inclination of the linear relationship to an appropriate value, the above-mentioned modification functions in the same manner as the second embodiment of the present invention.

A description will now be given of a third preferred embodiment of the present invention with reference to FIGS. 13 and 14. The third embodiment of the present invention is directed to learning the alteration reference value Vref while the vehicle is traveling on a flat road surface at a high speed so that it becomes easy for the shock absorber 2 to be set to the soft state. This is due to the fact that the driver and/or passenger will feel a vehicle vibration due to minor roughness on the road surface which less causes a vehicle vibration when the vehicle is traveling at a low speed.

Figure 13:
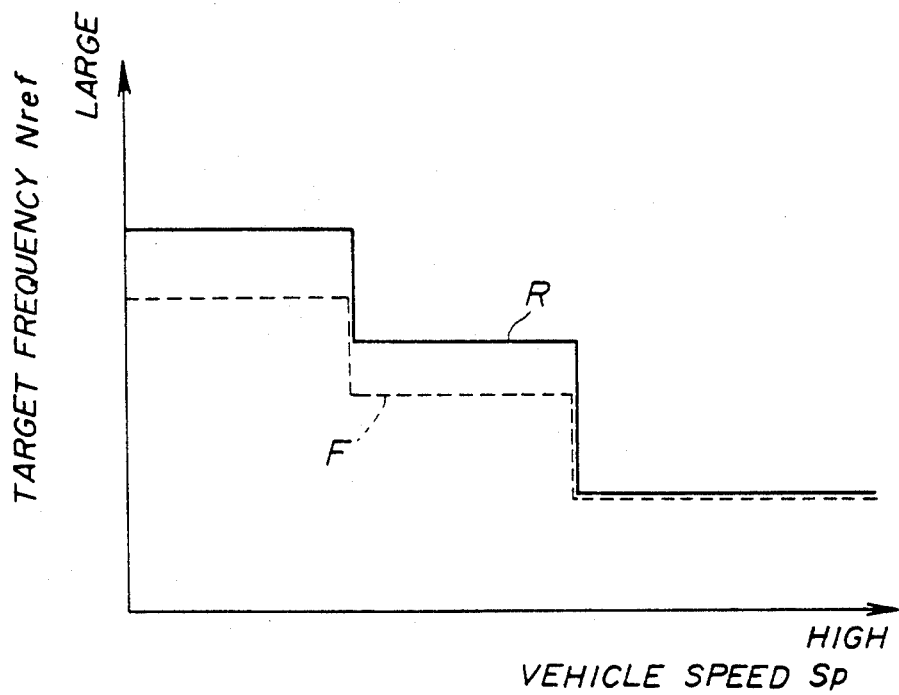
FIG. 13 is a graph illustrating the relationship between a target frequency and a vehicle speed.
Figure 14:
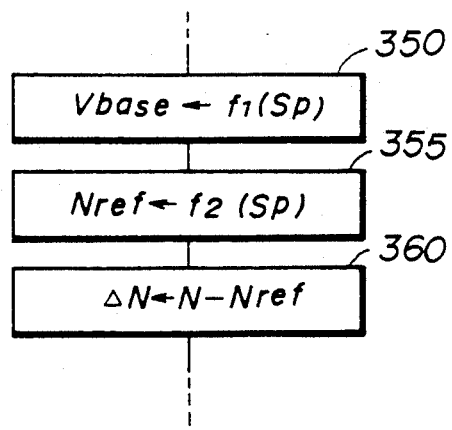
FIG. 14 is a flowchart of an essential feature of a suspension control system according to a third preferred embodiment of the present invention.

In the third embodiment of the present invention, as shown in FIG. 13, the target frequency Nref is defined as a function of the vehicle speed Sp, $f_2(Sp)$ in which the target frequency Nref decreases with an increase in the vehicle speed Sp. The third embodiment of the present invention is realized, as shown in FIG. 14, by adding step 355 between steps 350 and 360 shown in FIG. 7. At step 355, the target frequency Nref is calculated from the current vehicle speed Sp, as is shown in FIG. 13.

When the vehicle is traveling at a high speed, the learning control of the alteration reference value Vref is carried out for every short judgment period while the target frequency Nref used for judging the road surface condition is set to a small value. As a result, it becomes easier for the suspension to be altered to the hard state, so that improved driving controllability and stability can be obtained. In addition, since the learning interval is short, it becomes possible to rapidly obtain an appropriate alteration reference value Vref which very reliably reflects the road surface condition. Further, according to the third embodiment of the present invention, it is possible to precisely judge the road surface condition when the vehicle is running at a high speed.

Since the frequency detection interrupt routine shown in FIG. 6 is carried out at constant intervals, there is a difference between the damping force change rates V obtained at different speeds. That is, it is difficult to precisely detect roughness of the road surface while the vehicle is traveling at a high speed, Thus, the detection precision deteriorates, and therefore the detected frequency N may not accurately reflect the real road surface condition. On the other hand, according to the third embodiment of the present invention, the target frequency N is decreased with an increase in the vehicle speed Sp. Thus, the above-mentioned disadvantage can be overcome, and thus it becomes possible to precisely judge whether or not the vehicle is traveling on a continuously flat or rough road surface even when the vehicle is traveling at a high speed.

In the third embodiment of the present invention, it is possible to carry out the learning control of the alteration reference value Vref each time the vehicle has gone the predetermined distance Do as in the case of the aforementioned second embodiment of the present invention. Also, as shown in FIG. 13, it is possible to use different settings of the target frequency respectively for the front and rear wheels F and R. In the case shown in FIG. 13, the target frequency N for the front wheels F is less than that for the rear wheels R.

It will be noted that several variations may be made within the scope of the first through third preferred embodiments of the present invention. For example, it is possible to renew the alteration reference value Vref on the basis of the time during which the damping force change rate V is greater than the damping force reference value Vref. It is also possible to renew the alteration reference value Vref on the basis of the time during which the suspension is maintained in the soft state. It is possible to provide the target frequency Nref for each of the wheels 5FL, 5FR, 5RL and 5RR. It is possible to use two target frequencies Nref respectively provided for the hard and soft states in place of the learning reference values VrefG provided respectively for the hard and soft states.

A description will now be given of a fourth preferred embodiment of the present invention. The fourth embodiment of the present invention is directed toward improving the aforementioned embodiments of the present invention. In the aforementioned embodiments of the present invention, there is room for improvement regarding the damping force control which is carried out when the vehicle is traveling on a so-called composite road surface where there is minor roughness on a gently rising and falling road surface. Such minor roughness will causes a long-term vehicle vibration having a time duration equal to about one second.

Figure 15:
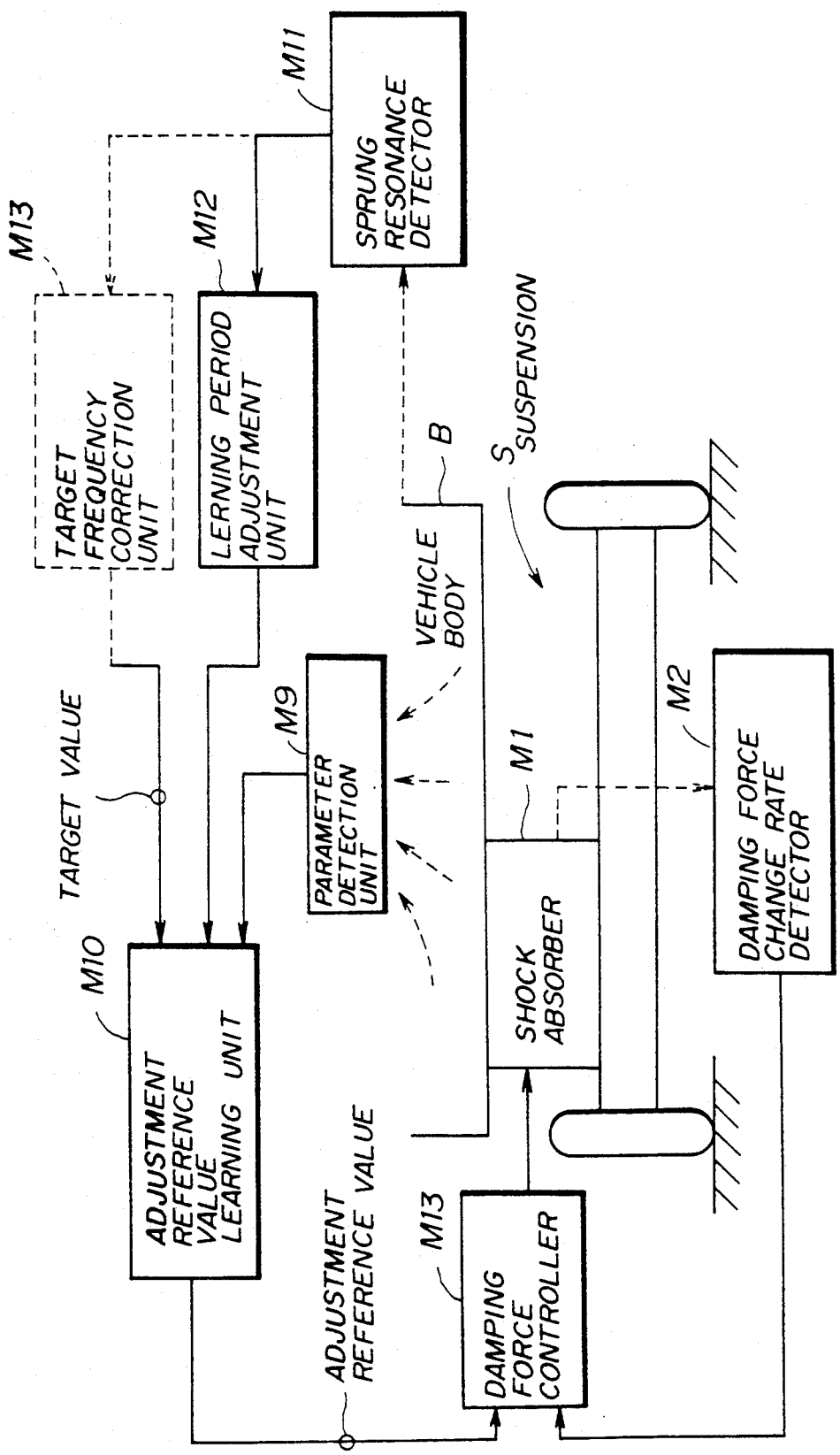
FIG. 15 is a block diagram illustrating the outline of a suspension control system according to a fourth embodiment of the present invention.

Referring to FIG. 15, there is illustrated the outline of a suspension control system according to the fourth embodiment of the present invention. In FIG. 15, those parts which are the same as those shown in FIG. 1 are given the same reference numerals. A parameter detection unit M9 detects a damping force alteration parameter related to the damping force of the shock absorber M1. The damping force alteration parameter is, for example, the aforementioned frequency N or the level of the damping force obtained after the setting of the damping force is altered. An adjustment reference value learning unit M10 learns, for every predetermined period, the adjustment reference value (alteration reference value Vref) which is to be supplied to the damping force controller M3 so that the damping force alteration parameter detected by the parameter detection unit M9 becomes equal to a target value. A sprung resonance component detection unit M11 detects a vibration of a vehicle body B (vehicle vibration) about a sprung resonance frequency, that is, a sprung resonance component. A learning period adjustment unit M12 adjusts, on the basis of the magnitude (level) of the detected sprung resonance component, a learning period during which the learning control of the adjustment reference value Vref is carried out. More specifically, the learning period adjustment unit M12 shortens the learning period as the sprung resonance component of the vehicle body B increases. Thus, when the vehicle is traveling on the aforementioned composite road surface, an appropriate setting of the damping force is determined during a short learning period, so that the damping force of the shock absorber M1 is rapidly set to an increased level. In the above-mentioned manner, the setting of the shock absorber M1 is determined taking into account the sprung resonance component. It will be noted that a target frequency correction unit M13 is used in a fifth embodiment of the present invention, which will be described later.

Figure 16:
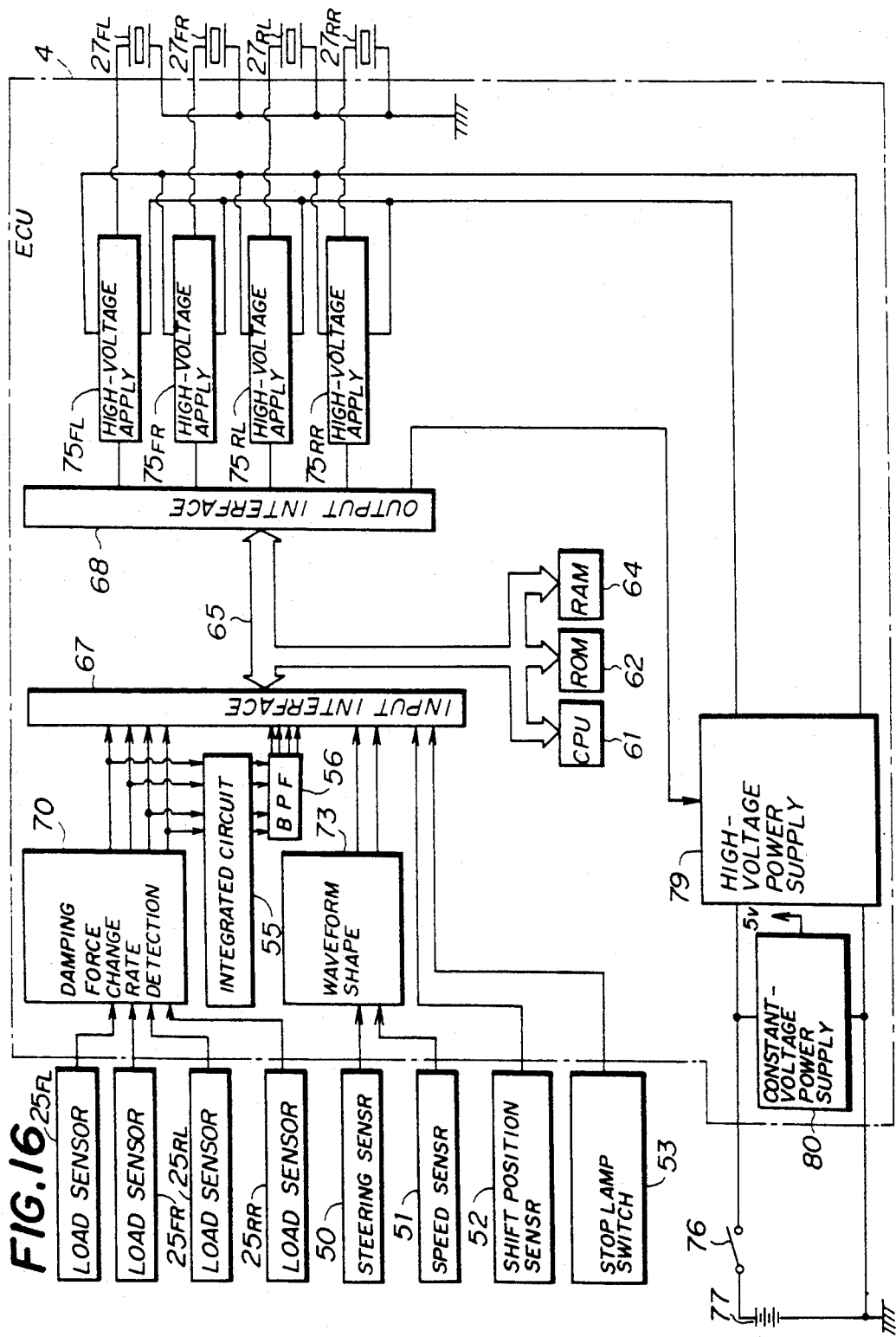
FIG. 16 is a detailed block diagram illustrating the structure of the suspension control system shown in FIG. 15.

Referring to FIG. 16, there is illustrated the entire electrical system of the suspension control system according to the fourth embodiment of the present invention. In FIG. 16, those parts which are the same as those shown in FIG. 4 are given the same reference numerals. The configuration shown in FIG. 16 is obtained by adding an integrated circuit 55 and a bandpass filter (BPF) 56 to the suspension control system shown in FIG. 4.

The damping force change rate signals V respectively provided for the four shock absorbers 2 are input to the integrated circuit 55, which respectively integrates the damping force change rate signals V. The integrated damping force change rate signals V are then input to the bandpass filter 56. The bandpass filter 56 allows only frequency components about a sprung resonance frequency to pass through. For example, the bandpass filter 56 allows asses components having frequencies between about 1.0 [Hz] and 1.5 [Hz] pass through. The filtered frequency components reflect a long-term vehicle vibration of the vehicle due to the sprung resonance. Thereinafter, each of the filtered frequency components respectively provided for the four shock absorbers 2 is referred to as a sprung resonance component signal SVup.

Figure 17A:
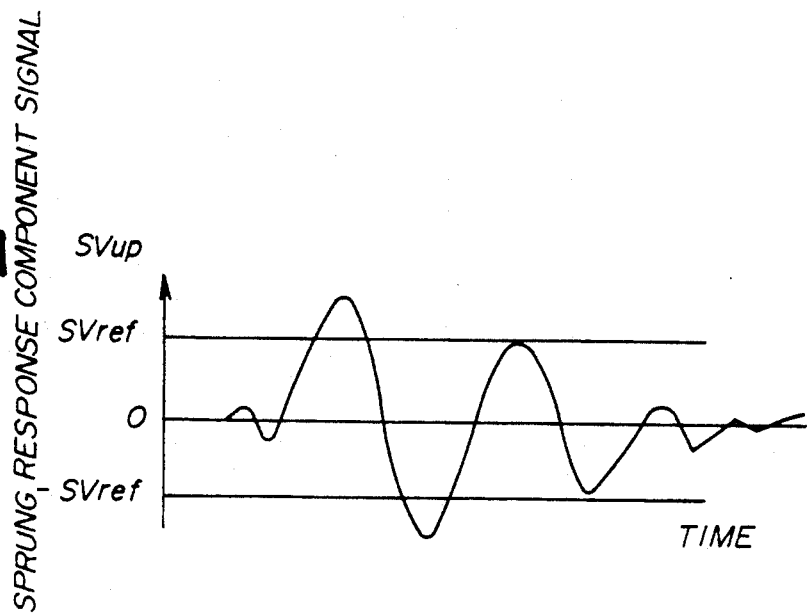
FIG. 17A is a waveform diagram illustrating a sprung resonance component signal.
Figure 17B:
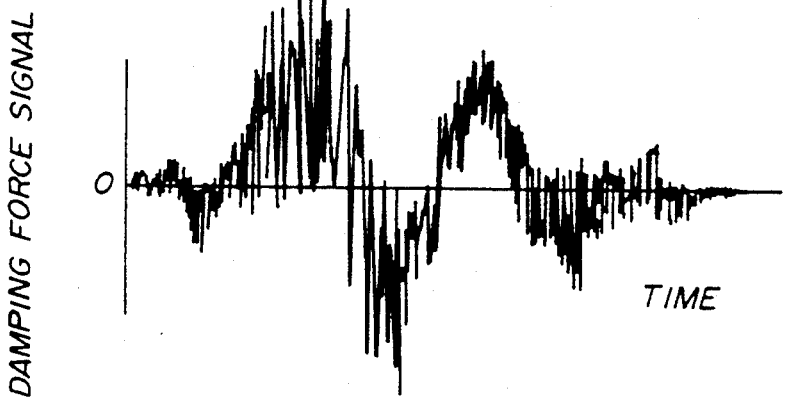
FIG. 17B is a waveform diagram illustrating a damping force change rate signal.

FIG. 17A is a graph showing a waveform of the sprung resonance component signal. FIG. 17B is a graph illustrating an integrated damping force change rate output by the integrated circuit 55.

A description will now be given of the operation of the configuration shown in FIG. 16. The damping force control according to the fourth embodiment of the present invention uses the procedures shown in FIGS. 5 and 6, an alteration reference value learning routine shown in FIG. 18 which is substituted for the routine shown in FIG. 7, and a learning period alteration route shown in FIG. 19. The descriptions of the procedures shown in FIGS. 5 and 6 are omitted.

Figure 18:
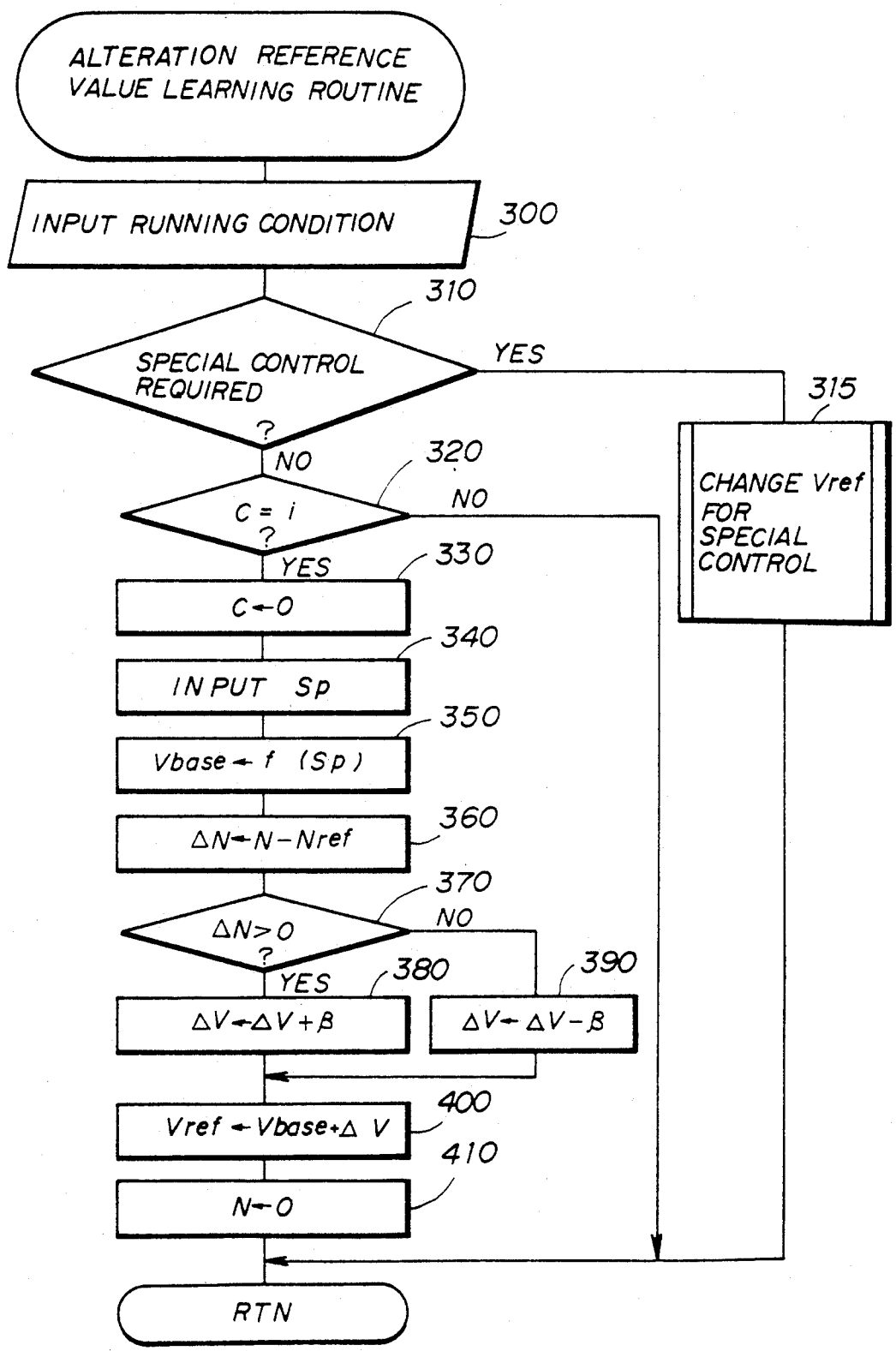
FIGS. 18 and 19 are flowcharts illustrating the operation of the suspension control system according to the fourth preferred embodiment of the present invention.

In FIG. 18, those parts which are the same as those shown in FIG. 7 are given the same reference numerals. The procedure shown in FIG. 18 is different from that shown in FIG. 7 in that the procedure shown in FIG. 18 does not have the steps 317, 318 and 319 shown in FIG. 7. That is, step 320 is carried out immediately after step 310. The learning period i is not changed on the basis of the vehicle speed Sp but is instead changed on the basis of the sprung resonance component signal as shown in FIG. 19.

Figure 19:
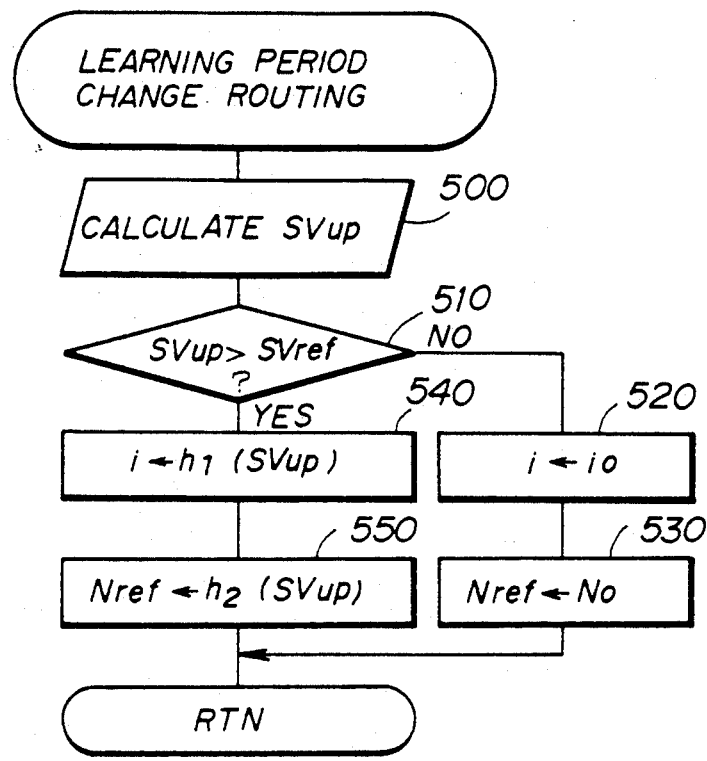

The learning period shown in FIG. 18 is determined by the procedure shown in FIG. 19, which is activated at predetermined intervals. The CPU 61 inputs the sprung resonance component signals SVup output by the bandpass filter 56 (FIG. 16), and carries out the learning period alternation routine shown in FIG. 19 respectively for the four shock absorbers 2. It is possible to use the sprung resonance component signals SVup as they are. Alternatively, it is possible to respectively calculate weighted averages of the current levels of the damping forces and the averages of the levels of the sprung resonance component signals and use the averages during the procedure starting from step 510.

At step 510, the CPU 61 determines whether or not the sprung resonance component signal SVup considered has a level (amplitude) greater than that of a threshold level SVref shown in FIG. 17A. When it is determined that SVup≦SVref, an initial value $i_0$ is written into the variable i at step 520, and the target frequency Nref is set to an initial value $N_0$ at step 530. On the other hand, when it is determined that SVup>SVref, the value of a function of the sprung resonance component signal SVup, h1(SVup), is written into the variable i corresponding to the learning period at step 540. At subsequent step 550, the value of a function of the sprung resonance component signal, h2(SVup), is written into the target frequency Nref.

Figure 17C:
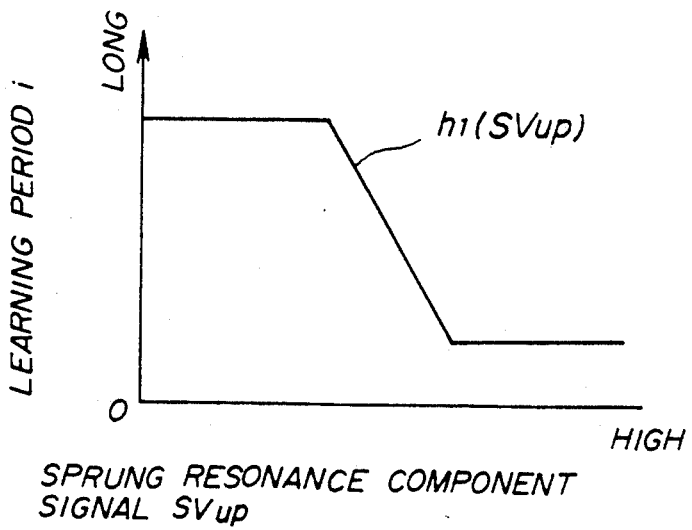
FIG. 17C is a graph illustrating the relationship between a learning period and the sprung resonance component signal.

As shown in FIG. 17C, the learning period decreases with an increase in the level of the sprung resonance component signal SVup within a predetermined level range. The function h1(SVup) is not limited and various alternatives can be used. As shown in FIG. 17D, the target frequency Nref decreases with an increase in the level of the sprung resonance component signal SVup within a predetermined level range. When step 540 is carried out, step 550 is also carried out. This is directed to compensating for a situation where the frequency N, that is, the number of times that the damping force change rate V exceeds the alteration reference value Vref, decreases as the learning period i is shortened. It is preferable that the following relationship be satisfied:

$$h2(SVup)/h1(SVup) \leq N_0/i_0.$$

After step 530 or 550 is executed, the procedure shown in FIG. 19 ends.

The above-mentioned fourth embodiment of the present invention presents especial advantages in addition to those presented by the aforementioned embodiments of the present invention. When the vehicle is traveling on a composite road surface having minor roughness on a gently rising and falling road surface, the learning period i is reduced since the sprung resonance component increases. Thereby, the suspension characteristic is changed so that it tends toward the hard state, so that riding comfort on the composite road surface can be improved.

In the fourth embodiment of the present invention, the learning period (variable) i is calculated on the basis of the level of the sprung resonance component signal SVup (step 540 shown in FIG. 19. Alternatively, it is possible to calculate the learning period i by determining whether or not the level of the sprung resonance component signal SVup, which changes in positive and negative level areas having a negative level and a positive level, is within the range between −SVup and +SVup (see FIG. 17A). In this alternative, the learning period i of the alteration reference value Vref is shortened during a predetermined time period from the time when it is determined that the level of the sprung resonance component signal SVup has gone outside of the range between −SVup and +SVup. It is also possible to continuously shorten the learning period i at a predetermined rate during the above predetermined time period.

Figure 20:
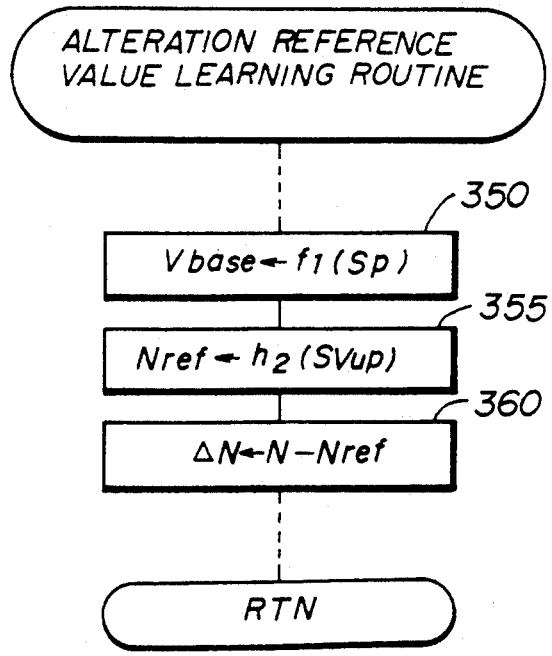
FIG. 20 is a flowchart illustrating an essential feature of a suspension control system according to a fifth preferred embodiment of the present invention.

A description will now be given of a suspension control system according to a fifth embodiment of the present invention. The target frequency correcting unit M13 is provided in addition to or instead of the learning period adjusting means. The target frequency correcting unit M13 decreases the target frequency Nref as the level of the sprung resonance component signal SVup increases. The procedure according to the fifth embodiment of the present invention is different from the aforementioned fourth embodiment of the present invention in that as shown in FIG. 20, step 355 is added between steps 350 and 360 shown in FIG. 18. After the base value Vbase is calculated on the basis of the vehicle speed Sp at step 350, the target frequency Nref is corrected to the level of the sprung resonance component signal SVup. After that, the frequency deviation ΔN is calculated at step 360. Step 355 is the same as the aforementioned step 550 shown in FIG. 19. Thus, the target frequency Nref is decreased as the level of the sprung resonance component signal SVup increases. As a result, when the vehicle is traveling at a high speed, the target frequency Nref is decreased, so that it becomes easy for the shock absorber 2 being considered to be altered to the hard state. Hence, the suspension characteristic obtained when the vehicle is traveling on the composite road surface is set to a hard-oriented state, as compared with the suspension characteristic obtained when the vehicle is traveling on a simple rough road surface. With the above setting of the shock absorber, it becomes possible to prevent the occurrence of a long-term vehicle vibration while maintaining good riding comfort.

The present invention is not limited to the specifically described embodiments, and variations and modifications thereof may be made without departing from the scope of the present invention.

What is claimed is:

1. A suspension control system for controlling a suspension having a shock absorber provided for each wheel of a vehicle, said suspension control system comprising:
   damping force change rate detecting means, for detecting a damping force change rate indicating a rate of change of a damping force of said shock absorber;
   damping force controlling means, coupled to said shock absorber and said damping force change rate detecting means, for altering the setting of said damping force on the basis of a relationship between said damping force change rate and an adjustment reference value;
   road surface condition detecting means for detecting, for every first period, a condition of a road surface on which said vehicle is running on the basis of a change of the damping force of said shock absorber;
   damping force adjustment correcting means, coupled to said damping force controlling means and said road surface condition detecting means, for correcting said adjustment reference value by learning, for every second period, said adjustment reference value on the basis of a parameter related to the damping force of said shock absorber which reflects the condition of the road surface; and
   period adjusting means, coupled to said road surface condition, for adjusting said first period on the basis of a vehicle speed.

2. A suspension control system as claimed in claim 1, wherein said period adjusting means comprises means for shortening said first period as the vehicle speed increases.

3. A suspension control system as claimed in claim 1, wherein said period adjusting means comprises means for stepwise shortening said first period as the vehicle speed increases.

4. A suspension control system as claimed in claim 1, wherein said period adjusting means comprises means for gradually shortening said first period as the vehicle speed increases.

5. A suspension control system as claimed in claim 1, wherein said second period is equal to said first period, and said second period is also adjusted when said first period is adjusted.

6. A suspension control system as claimed in claim 1, further comprising:
   first determining means for determining whether or not said vehicle is in a state excluding an accelerating state and a decelerating state;
   second determining means for determining whether or not said first period elapses from a starting time, said road surface condition detecting means starting to detect the condition of the road surface from said starting time; and
   resetting means for resetting said second determining means to said starting time when said first determining means determines that said vehicle is in either said accelerating state or said decelerating state, so that said second determining means starts to determine whether or not said first period has elapsed from said starting time reset by said resetting means.

7. A suspension control system as claimed in claim 1, further comprising:
   determining means for determining whether or not said vehicle is in a state excluding an accelerating state and a decelerating state; and
   means for stopping said damping force adjustment correcting means correcting said adjustment reference value when said determining means determines that said vehicle is in either said accelerating state or said decelerating state.

8. A suspension control system as claimed in claim 1, further comprising:
   first determining means for determining whether or not said vehicle has traveled a predetermined distance after said second period has elapsed;
   second determining means for determining whether or not said second period has elapsed from a starting time; and
   resetting means for resetting said second determining means to said starting time when said first determining means determines that said vehicle has traveled said predetermined distance, so that said second determining means starts to determine whether or not said second period has elapsed from said starting time reset by said resetting means.

9. A suspension control system as claimed in claim 1, wherein:
   said damping force adjustment correcting means comprises frequency calculating means for calculating a frequency which indicates the number of times that said adjustment reference value exceeds a learning reference value for a predetermined period; and
   said frequency corresponds to said parameter related to the damping force of said shock absorber.

10. A suspension control system as claimed in claim 9, wherein said damping force adjustment correcting means comprises:
    comparing means for comparing said frequency with a target frequency and for outputting a frequency deviation obtained by subtracting said target frequency from said frequency; and
    correcting means for correcting said adjustment reference value on the basis of said frequency deviation.

11. A suspension control system as claimed in claim 10, wherein said correcting means corrects said adjustment reference value so that said frequency deviation becomes substantially zero.

12. A suspension control system as claimed in claim 10, wherein said correcting means corrects said adjustment reference value so that said adjustment reference value increases and thus it becomes difficult for said shock absorber to be altered to a soft state when said frequency is greater than said target frequency, and corrects said adjustment reference value so that said adjustment reference value decreases and thus it becomes easy for said shock absorber to be altered to said soft state when said frequency is equal to or less than said target frequency.

13. A suspension control system as claimed in claim 10, wherein said target frequency is a function of a vehicle speed, and wherein said suspension control system further comprises:
    speed sensor means for measuring a vehicle speed; and
    calculating means for calculating said target frequency on the basis of said vehicle speed measured by said speed sensor means.

14. A suspension control system as claimed in claim 10, wherein said target frequency decreases as the vehicle speed increase so that it becomes difficult for said shock absorber to be altered to a soft state.

15. A suspension control system as claimed in claim 9, wherein said learning reference value includes a first learning reference value used when said shock absorber is set to a hard state and a second learning reference value used when said shock absorber is set to a soft state.

16. A suspension control system as claimed in claim 15, wherein said first learning reference value is greater than said second learning reference value.

17. A suspension control system as claimed in claim 9, wherein said learning reference value is smaller than said adjustment reference value.

18. A suspension control system as claimed in claim 17, wherein said learning reference value is obtained by multiplying said adjustment reference value by a predetermined constant less than 1.

19. A suspension control system as claimed in claim 1, wherein said adjustment reference value includes a base value which is a function of a vehicle speed, and wherein said suspension control system further comprises:
    speed sensor means for measuring a vehicle speed; and
    calculating means for calculating said base value on the basis of said vehicle speed measured by said speed sensor means.

20. A suspension control system as claimed in claim 19, wherein said adjustment reference value includes a learning correction value in addition to said base value, and wherein said damping force adjustment correcting means comprises:
    first correcting means for increasing said learning correction value so that said adjustment reference value increases and thus it becomes difficult for said shock absorber to be altered to a soft state when said frequency is greater than said target frequency; and second correcting means for decreasing said learning correction value so that said adjustment reference value decreases and thus it becomes easy for said shock absorber to be altered to said soft state when said frequency is equal to or less than said target frequency.

21. A suspension control system for controlling a suspension having a shock absorber provided for a wheel of a vehicle, said suspension 22. A suspension control system for controlling a suspension having a shock absorber provided for a wheel of a vehicle, said suspension control system comprising:

damping force change rate detecting means, for detecting a damping force change rate indicating a rate of change of a damping force of said shock absorber;

damping force controlling means, coupled to said shock absorber and said damping force change rate detecting means, for altering the setting of said damping force on the basis of a relationship between said damping force change rate and an adjustment reference value;

damping force adjustment correcting means, coupled to said damping force controlling means, for correcting said adjustment reference value by learning, for every predetermined period, said adjustment reference value on the basis of a parameter related to a change of the damping force of said shock absorber;

sprung resonance component extracting means for extracting a sprung resonance component signal from said damping force change rate, said sprung resonance component signal including components having frequencies around a sprung resonance frequency of the shock absorber; and period adjusting means, coupled to said damping force adjustment correcting means and said sprung resonance component extracting means, for adjusting said predetermined period on the basis of said sprung resonance component signal.

23. A suspension control system as claimed in claim 22, wherein said period adjusting means comprises means for shortening said predetermined period as the level of said sprung resonance component signal increases.

24. A suspension control system as claimed in claim 22, wherein said damping force adjustment correcting means comprises:

frequency calculating means for calculating a frequency which indicates the number of times that said adjustment reference value exceeds a learning reference value within a predetermined period, said frequency corresponding to said parameter related to the damping force of said shock absorber;

comparing means for comparing said frequency with a target frequency and for outputting a frequency deviation obtained by subtracting said target frequency from said frequency; and correcting means for correcting said adjustment reference value on the basis of said frequency deviation.

25. A suspension control system as claimed in claim 24, further comprising target frequency adjusting means for adjusting said target frequency on the basis of said sprung resonance component signal.

26. A suspension control system as claimed in claim 25, wherein said target frequency adjusting means comprises means for decreasing said target frequency as the level of said sprung resonance component signal increases.

27. A suspension control system as claimed in claim 24, wherein said period adjusting means comprises:

comparing means for comparing said sprung resonance component signal with a predetermined threshold level and for outputting a comparison result; and means for adjusting said predetermined period on the basis of said comparison result.

28. A suspension control system as claimed in claim 27, wherein said means of the period adjusting means comprises means for shortening the predetermined period as the level of said sprung resonance component signal increases when said comparison result shows the sprung resonance component signal is greater than said predetermined threshold level.

29. A suspension control system as claimed in claim 28, further comprising means for decreasing said target frequency as the level of said sprung resonance signal increases.

30. A suspension control system as claimed in claim 27, wherein said means of the period adjusting means comprises means for setting said predetermined period to an initial value when said comparison result shows that the sprung resonance component signal is equal to or less than said predetermined threshold level.

31. A suspension control system as claimed in claim 30, further comprising means for setting said target frequency to an initial value.

32. A suspension control system as claimed in claim 22, wherein said sprung resonance component signal includes components having frequencies between about 1.0 [Hz] and 1.5 [Hz].

* * * * *